United States Patent
Kamachi et al.

(10) Patent No.: US 6,626,954 B1
(45) Date of Patent: Sep. 30, 2003

(54) INFORMATION PROCESSING APPARATUS/ METHOD AND PRESENTATION MEDIUM

(75) Inventors: Teruhisa Kamachi, Tokyo (JP); Hiroyuki Aga, Kanagawa (JP); Hiroki Tsukahara, Tokyo (JP); Junichi Nagahara, Tokyo (JP); Hidenori Karasawa, Tokyo (JP); Emi Arakawa, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/246,397

(22) Filed: Feb. 9, 1999

(30) Foreign Application Priority Data

Feb. 13, 1998 (JP) .......................................... P10-030794

(51) Int. Cl.7 .............................................. G06F 17/00
(52) U.S. Cl. ................................ 715/500.1; 715/501.1; 345/473
(58) Field of Search ............................ 707/500.1, 513, 707/501.1; 345/473–475, 757–758, 419, 706, 760, 727–728; 715/500.1, 501.1, 513; 463/30–35

(56) References Cited

U.S. PATENT DOCUMENTS

| | | | | |
|---|---|---|---|---|
| 5,261,041 A | * | 11/1993 | Susman ........................ 345/473 |
| 5,754,660 A | | 5/1998 | Shimizu ........................ 381/17 |
| 5,812,688 A | | 9/1998 | Gibson ......................... 381/119 |
| 5,884,029 A | | 3/1999 | Brush, II et al. ............ 381/119 |
| 6,007,338 A | | 12/1999 | DiNunzio et al. ............ 434/55 |
| 6,049,805 A | * | 4/2000 | Drucker et al. .............. 707/102 |
| 6,052,123 A | | 4/2000 | Lection et al. ............... 345/419 |
| 6,072,832 A | * | 6/2000 | Katto ..................... 375/240.28 |
| 6,142,913 A | | 11/2000 | Ewert .......................... 482/8 |
| 6,169,545 B1 | * | 1/2001 | Gallery et al. .............. 345/748 |
| 6,234,901 B1 | | 5/2001 | Nagoshi et al. ............... 463/33 |
| 6,362,817 B1 | * | 3/2002 | Powers et al. ............... 345/419 |
| 6,437,777 B1 | * | 8/2002 | Kamachi et al. ............. 345/419 |
| 6,466,239 B2 | * | 10/2002 | Ishikawa ..................... 345/850 |
| 2001/0044725 A1 | * | 11/2001 | Matsuda et al. ............ 704/269 |

OTHER PUBLICATIONS

Kouichi Matsuda, "Latest Trends of VRML and CyberPassage, VRML 2.0 and Java (part 1)", Bit, vol. 28, No. 7, Jul. 1966, pp. 29–36.

Kouichi Matsuda, "Latest Trends of VRML and CyberPassage, VRML 2.0 and Java (part 2)", Bit, vol. 28, No. 8, Aug. 1996, pp. 57–65.

Yasuaki Honda, "Latest Trends of VRML and CyberPassage, VRML+Network=Cyberspace?", Bit, vol. 28, No. 9, Sep. 1996, pp. 29–36.

Yasuaki Honda, "Latest Trends of VRML and CyberPassage, How to Build Multi-User Environment Using Cyberspace," Bit, vol. 28, No. 10, Oct. 1996, pp. 49–58.

* cited by examiner

Primary Examiner—Joseph H. Feild
(74) Attorney, Agent, or Firm—Bell, Boyd & Lloyd LLC

(57) ABSTRACT

A browser generates a sound of track 0 recorded in a MIDI file named music.mid. A Sony_AudioClip node receives data of the music.mid file as an event, outputting the data from a musicData field thereof to a musicData field of a Sony_MusicNoteInterpolator node. The Sony_MusicNoteInterpolator node interpolates a value between a value of a high sound and a value of a low sound prescribed by a keyValue field, outputting a result of the interpolation from value_changed. A PositionIP.value_changed field of a PositionInterpolator node outputs position data corresponding to data of the height of the sound supplied from the Sony_MusicNoteInterpolator node to a CONE_OBJ.set_ translation field of a CONE_OBJ Transform node. As a result, the position of an object is changed in synchronization with the generation of a sound.

9 Claims, 19 Drawing Sheets

FIG.10
| ELAPSED TIME | EVENT |
|---|---|
| N | DO |
| 2N | RE |
| N | MI |
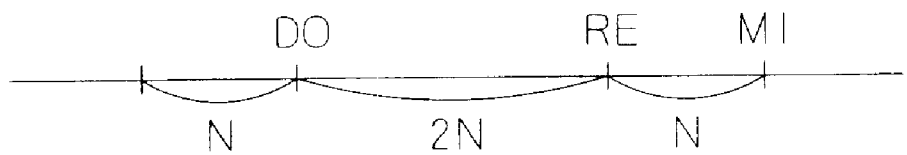
FIG.11
STATUS BYTE
1000 0000 (80H)
∫
1111 1111 (FFH)
DATA BYTE
1000 0000 (00H)
∫
0111 1111 (7FH)

FIG. 12

| MESSAGE TYPE | STATUS | FIRST BYTE | SECOND BYTE |
|---|---|---|---|
| NOTE OFF | 8nH | NOTE NUMBER | VELOCITY |
| NOTE ON | 9nH | NOTE NUMBER | VELOCITY |
| POLYPHONIC KEY PRESSURE | AnH | NOTE NUMBER | PRESSURE |
| CONTROL CHANGE | BnH | CONTROL NUMBER | DATA |
| PROGRAM CHANGE | CnH | PROGRAM NUMBER | |
| CHANNEL PRESSURE | DnH | PRESSURE | |
| PITCH BEND CHANGE | EnH | DATA (LSB) | DATA (MSB) |
| EXCLUSIVE | F0H | MAKER ID | DATA (ARBITRARY LENGTH) |
| MTC QUARTER FRAME | F1H | FRAME/SECOND/MINUTE/HOUR | |
| SONG POSITION POINTER | F2H | DATA (LSB) | DATA (MSB) |
| SONG SELECT | F3H | SONG NUMBER | |
| TUNE REQUEST | F6H | | |
| END OF EXCLUSIVE | F7H | | |
| TIMING CLOCK | F8H | | |
| START | FAH | | |
| CONTINUE | FBH | | |
| STOP | FCH | | |
| ACTIVE SENSING | FEH | | |
| SYSTEM RESET | FFH | | |

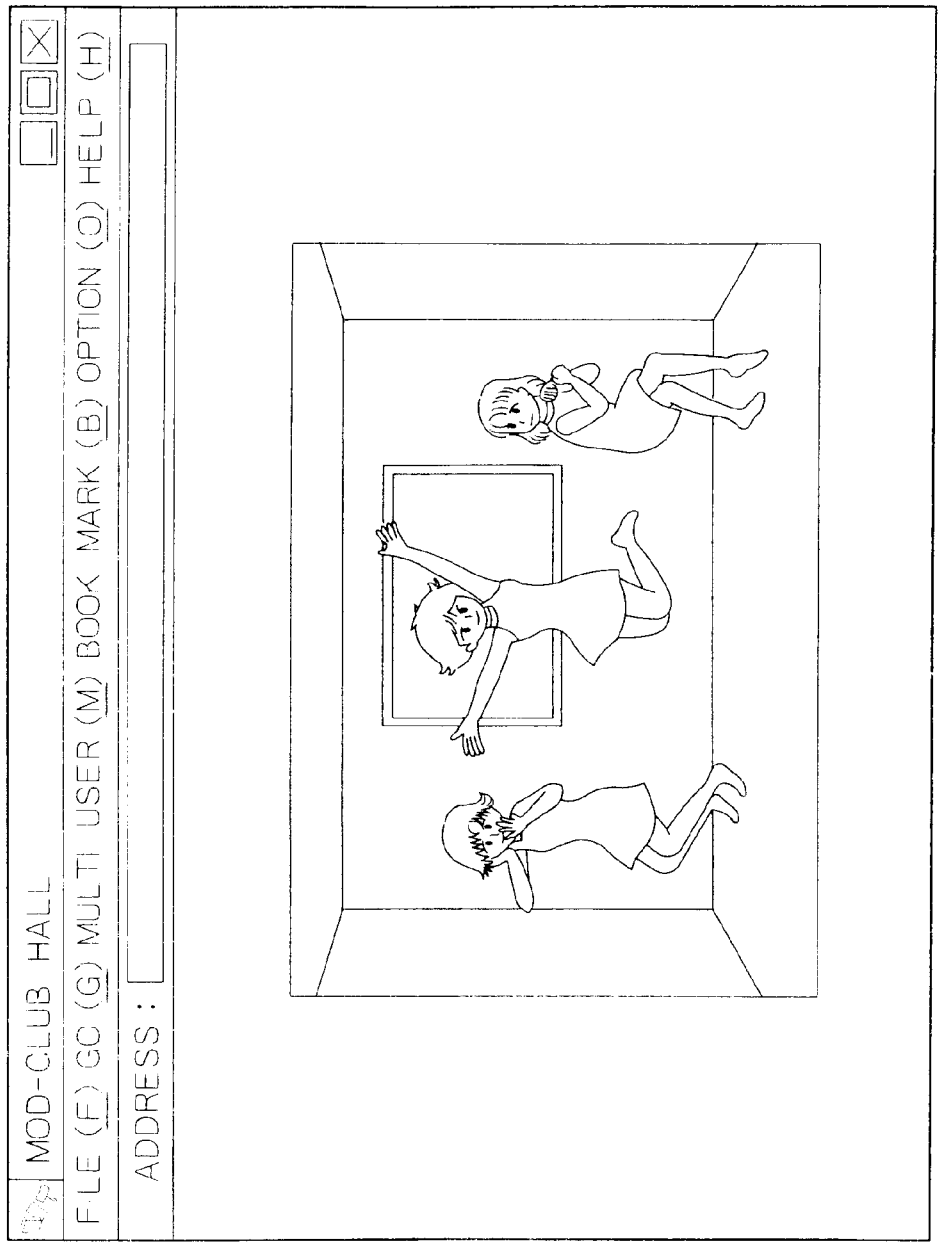

INFORMATION PROCESSING APPARATUS/ METHOD AND PRESENTATION MEDIUM

BACKGROUND OF THE INVENTION

In general, the present invention relates to an information processing apparatus, an information processing method and a presentation medium. More particularly, the present invention relates to an information processing apparatus, an information processing method and a presentation medium which allow generation of a sound and a movement of a picture to be synchronized with each other in a 3-dimensional virtual reality space expressed in a VRML.

In the Internet serving as a computer network constructed at a world-wide scale, there is known a VRML (Virtual Reality Modeling Language) as a descriptive language capable of treating 3-dimensional information uniformly by making use of the construction of a WWW (World Wide Web) which provides various kinds of information.

As a system usable in the Internet for providing information, there is known the WWW which was developed by CERN (European Center for Nuclear Research) of Switzerland. The WWW allows information such as texts, pictures and sounds to be viewed or listened to in a hypertext format. To put it in detail, the information stored in a WWW server is transmitted to a terminal such as a personal computer asynchronously by using a protocol referred to as an HTTP (Hyper Text Transfer Protocol).

The WWW server comprises the HTTP, server software known as "daemon" and an HTML file for storing hyper-text information. It should be noted that the daemon software is a program for executing control and processing in a background when doing jobs under UNIX. Hypertext information is expressed by using a descriptive language called an HTML (Hyper Text Markup Language). In a description of a hypertext written in the HTML, the logical structure of a statement is expressed in terms of format specifications which are each called a tag expressed by sandwiching a statement with the symbols "<" and ">". A link with other information is described by using link information referred to as an "anchor". When a location of information is specified by making use of an anchor, a string of characters known as a URL (Uniform Resource Locator) is utilized.

The HTTP is a protocol for transferring a file described in the HTML through the network. There are provided functions whereby a request for information is transmitted from a client to the WWW server and hypertext information of an HTML file is transferred to the client by the WWW server in response to the request.

Widely used as an environment utilizing the WWW is a WWW browser where the verb "to browse" of the word "browser" means "to view here and there". To be more specific, the WWW browser is a client software represented mainly by Netscape Navigator, a trademark of a US company named Netscape Communication Corporation. By using the WWW browser, it is possible to browse the so-called home pages, that is, files represented by a URL on the WWW server of the Internet which is spread at a world-wide scale. To put it concretely, it is possible to make an access to a great variety of information sources on the WWW by tracing link-connected home pages from a page to a next one in an operation called net surfing.

In recent years, specifications of a 3-dimensional-graphic describing language referred to as a VRML have been developed to further expand the WWW. The 3-dimensional-graphic describing language allows a hypertext link to be set for a description of a 3-dimensional virtual reality space or an object rendered as a 3-dimensional graphic and allows accesses to be made sequentially to such descriptions and such objects through the WWW server by tracing their links. In addition, there has also been developed a VRML browser for displaying a 3-dimensional virtual space, which is described in accordance with the specifications of this VRML.

References describing details of the VRML include "VRML: Browsing & Building Cyberspace" authored by Mark Pesce, 1995 New Readers Publication ISBN 1-56205-498-8 and "Most Recent Trend of VRML and CyberPassage" authored by Kohichi Matsuda and Yasuaki Honda, compiling an articles in a Bit magazine of Vol. 28, No. 7 pp29 to pp36, No. 8 pp57 to pp65, No. 9 pp29 to pp36 and No. 10 pp49 to pp58 published by Kyoritsu in 1996. It should be noted that the former reference is translated by Kohichi Matsuda, Terutaka Uraji, Shohichi Takeuchi, Yasuaki Honda, Junichi Toshimoto, Masayuki Ishikawa, Ken Miyashita and Kazuhiro Hara into Japanese and published by Prentice Hall Publication ISBN4-931356-37-0 with a first edition published on Mar. 25, 1996.

In addition, a formal and complete specification sheet of "The Virtual Reality Modeling Language Version 2.0, ISO/IEC CD 14772", is disclosed at "www.vrml.org/Specifications/VRML2.0/FINAL/spec/in dex.html". A version written in Japanese is disclosed at "www.webcity.co.jp/info/andoh/VRML/vrm 12.0/spec-jp/index.html".

As a browser for VRML2.0 and software for a shared server, Sony Corporation which is the applicant of this patent has developed "Community Place (Trademark) Browser/Bureau" as a commercial product. β-version (a prototype) of this product can be downloaded from a home page on the Internet at "vs.sony.co.jp".

With such VRML2.0, it is possible to describe and express an independent behavior of an object in a 3-dimensional virtual reality space. In order to create VRML contents, in which an object actively moves around in the 3-dimensional virtual reality space using VRML2.0, it is necessary to proceed a series of work like the one described below. VRML contents are a collection of information such as VRML files and script files used for implementing a series of object's behaviors in one virtual reality space.

The following is a description of a series of work to create VRML contents.

Work to create a model is a job to describe attributes of an object or a model such as the shape and the position thereof located in a virtual reality space in VRML2.0 and to make a basic VRML file.

Description of a sensor node is a work to add a description of the sensor node to a VRML file. An example of the sensor node is TouchSensor which is used for generating an event when a click operation or a pointing operation is carried out by means of a mouse. Another example of the sensor node is TimeSensor for generating an event at a point of time set in advance.

Work to edit a routing is a job to add a description of a routing to a VRML file. A routing is used for propagating an event generated by a pointing operation or the like carried out on a sensor node associated with an object.

Description of a script node is a work to add a description of the script node to a VRML file. A script node is used for passing an event propagated through a routing to an external script.

Creation of a script file is a work to describe or to program a script in a language such as the Java for expressing behaviors of objects in a virtual reality space set in advance on the basis of an event passed by way of a script node. It should be noted that Java is a trademark of Sun Microsystems Corporation, a US company.

Desired VRML contents are created by doing the various kinds of work described above.

In order to create VRML contents accompanying an independent behavior of an object in a virtual reality space, it is necessary to form the shape of the object and to create animation by using existing authoring software called a modeler and to output the work as a file of the VRML2.0 format. An example of the authoring software is 3D Studio Max, a trademark. If the modeler does not support the VRML2.0 format, it is then necessary to convert the format of the output file into the VRML2.0 format by using a tool such as a converter.

Subsequently, descriptions of a variety of sensor nodes as well as other descriptions expressed in VRML2.0 format are added to a VRML file by using a text editor, and pieces of work such as creation of a script in the Java by using the text editor, addition of a script node associated with the Java script and addition of a route statement are done repeatedly. Finally, in verification of an actual behavior of an object, a VRML browser for VRML2.0 is activated to check the behavior of the object by carrying out operations such as clicking by means of the mouse.

In addition, with VRML2.0, a user is allowed to increase the number of node types by defining a new node type. In addition, a node of the newly defined node type can be used as if the node were an existing built-in node. A new node type defined by the user is referred to as ProtoType. A keyword "PROTO" is used in defining ProtoType.

By the way, a processing time of picture data is not prescribed particularly in VRML2.0. For example, assume processing to display a movement of an avatar, a model or an object in a 3-dimensional virtual reality space, from a point $P_1$ to another point $P_2$ as shown in FIG. 1. In this case, there is no prescription which states that the processing has to be carried out in a predetermined period of time. For this reasons, the time necessary for moving the avatar from the point $P_1$ to the point $P_2$ varies in dependence on the performance of an information processing apparatus for executing a program for such movement.

In processing to generate a sound in a 3-dimensional virtual reality space, on the other hand, once generated, the generation of the sound has to be executed in a real-time manner. To put it concretely, take up reproduction of a piece of music as an example. In this case, the time for reproducing the piece of music from its beginning to the end thereof is fixed without regard to what information processing apparatus is used for the reproduction.

As a result, a problem is encountered in the design of a program for a 3-dimensional virtual reality space by means of a predetermined information processing apparatus wherein generation of the sound of a predetermined piece of music is started in synchronization with the start of the movement of the avatar from the point P1 and, then, precisely ended with timing synchronized with the arrival of the avatar at the point P2 as shown in FIG. 1. To be more specific, while the generation of the sound can be ended synchronously with the timing of the arrival of the avatar at the point P2 by executing the program on the predetermined information processing apparatus, the execution time of the program varies from apparatus to apparatus. This is because characteristics of the information processing apparatus such as the CPU's clock frequency and the picture processing performance thereof vary from apparatus to apparatus.

As a result, there is a problem that a movement of a picture can not be synchronized with generation of a sound accompanying the movement by using the conventional VRML2.0 software as described above. For example, the avatar may not be reached to $P_2$ although the generation of sounds has already terminated, or vice versa.

SUMMARY OF THE INVENTION

It is thus an object of the present invention addressing the problem described above to synchronize a movement of a picture with generation of a sound accompanying the movement.

An information processing apparatus for presenting a 3-dimensional virtual reality space expressed in a VRML according to claim 1 is characterized in that said information processing apparatus includes a specification means for specifying a sound source, an output means for outputting data of a sound source specified by said specification means as an event, a display control means for displaying a picture of a predetermined object, and a modification means for making a change to a picture of said object related to an event output by said output means.

An information processing method for presenting a 3-dimensional virtual reality space expressed in a VRML according to claim 2 is characterized in that said information processing method includes a specification step of specifying a sound source an output step of outputting data of a sound source specified at said specification step as an event a display control step of displaying a picture of a predetermined object; and a modification step of making a change to a picture of said object related to an event output at said output step.

A recording medium for recording a computer program to be executed by an information processing apparatus for presenting a 3-dimensional virtual reality space expressed in a VRML according to claim 3 is characterized in that said recording medium is used for providing a computer with an information processing method comprising a specification step of specifying a sound source an output step of outputting data of a sound source specified at said specification step as an event a display control step of displaying a picture of a predetermined object, and a modification step of making a change to a picture of said object related to an event output at said output step.

In the information processing apparatus according to claim 1, the information processing method according to claim 2 and the recording medium according to claim 3, when data of a sound source is output as an event, a change related to the output event is made to a picture of an object.

BRIEF DESCRIPTION OF THE DRAWINGS

FIG. 10 is an explanatory diagram used for describing a lapsed time in a MIDI file FIG. 11 is an explanatory diagram used for describing a status byte and data bytes of a MIDI message;

FIG. 12 shows a table of types of midi message;

FIG. 21 is a diagram showing another example of synchronization of the movement of a picture to generation of a sound accompanying the movement, in which an avatar dances along generation of sound synchronized with the movement.

DETAILED DESCRIPTION OF THE PREFERRED EMBODIMENTS

Before explaining embodiments of the present invention, a relation between each means described in the claims and an embodiment implementing the means is clarified as follows. In the following description of a characteristic of the present invention, each means is followed by a typical embodiment for the means enclosed in parentheses. It is needles to say, however, that the description is not intended to imply that implementation of a means is limited to a typical embodiment appended in parentheses to the means.

An information processing apparatus for presenting a 3-dimensional virtual reality space expressed in a VRML according to claim 1 is characterized in that said information processing apparatus includes a specification means (implemented typically by an eventTracks field shown in FIG. 16) for specifying a sound source an output means (implemented typically by a musicData field shown in FIG. 16) for outputting data of a sound source specified by said specification means as an event, a display control means (implemented typically by a diffuseColor field shown in FIG. 16) for displaying a picture of a predetermined object, and a modification means (implemented typically by a fraction_changed field shown in FIG. 16) for making a change to a picture of said object related to an event output by said output means.

Figure 1:
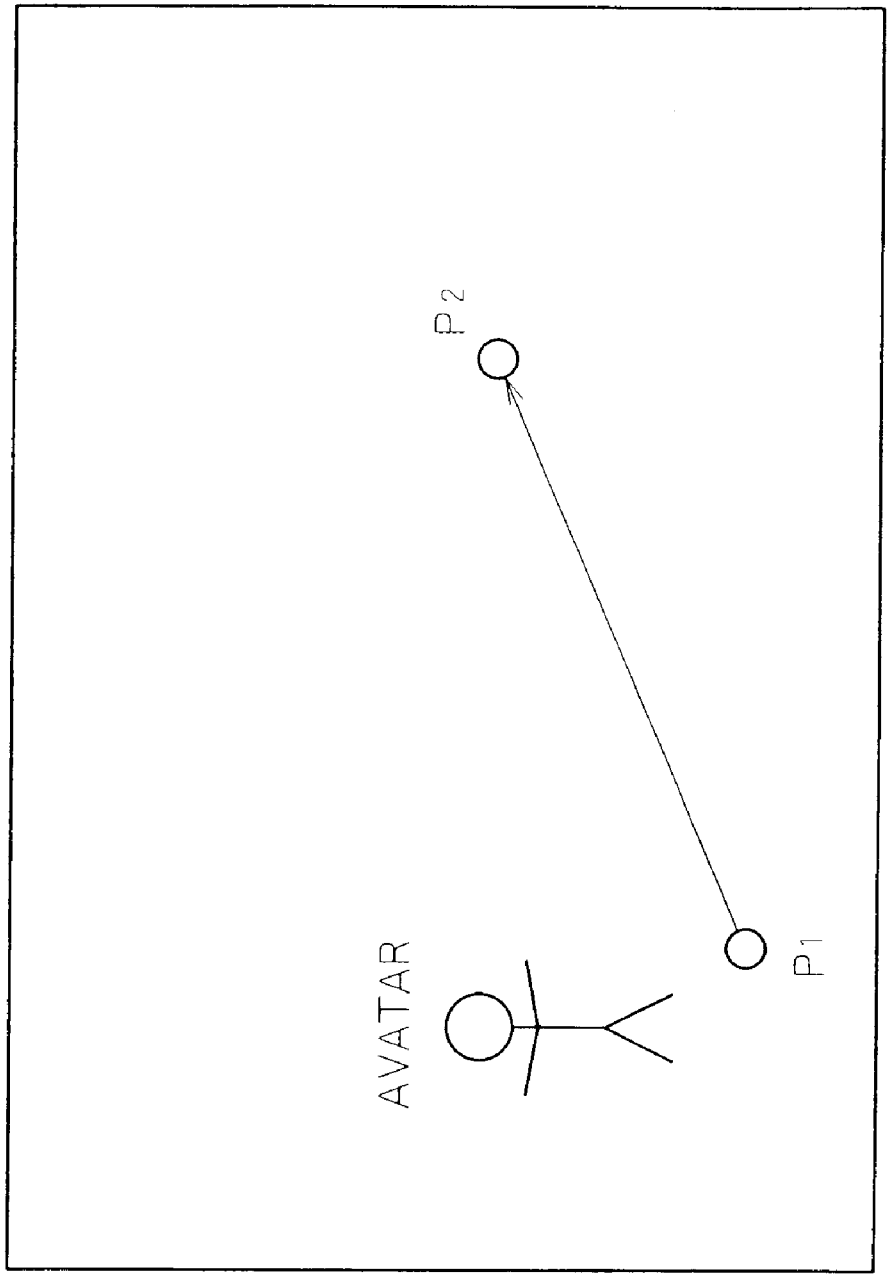
FIG. 1 is an explanatory diagram showing the related art synchronization of a movement of a picture with generation of a sound accompanying the movement.
Figure 2:
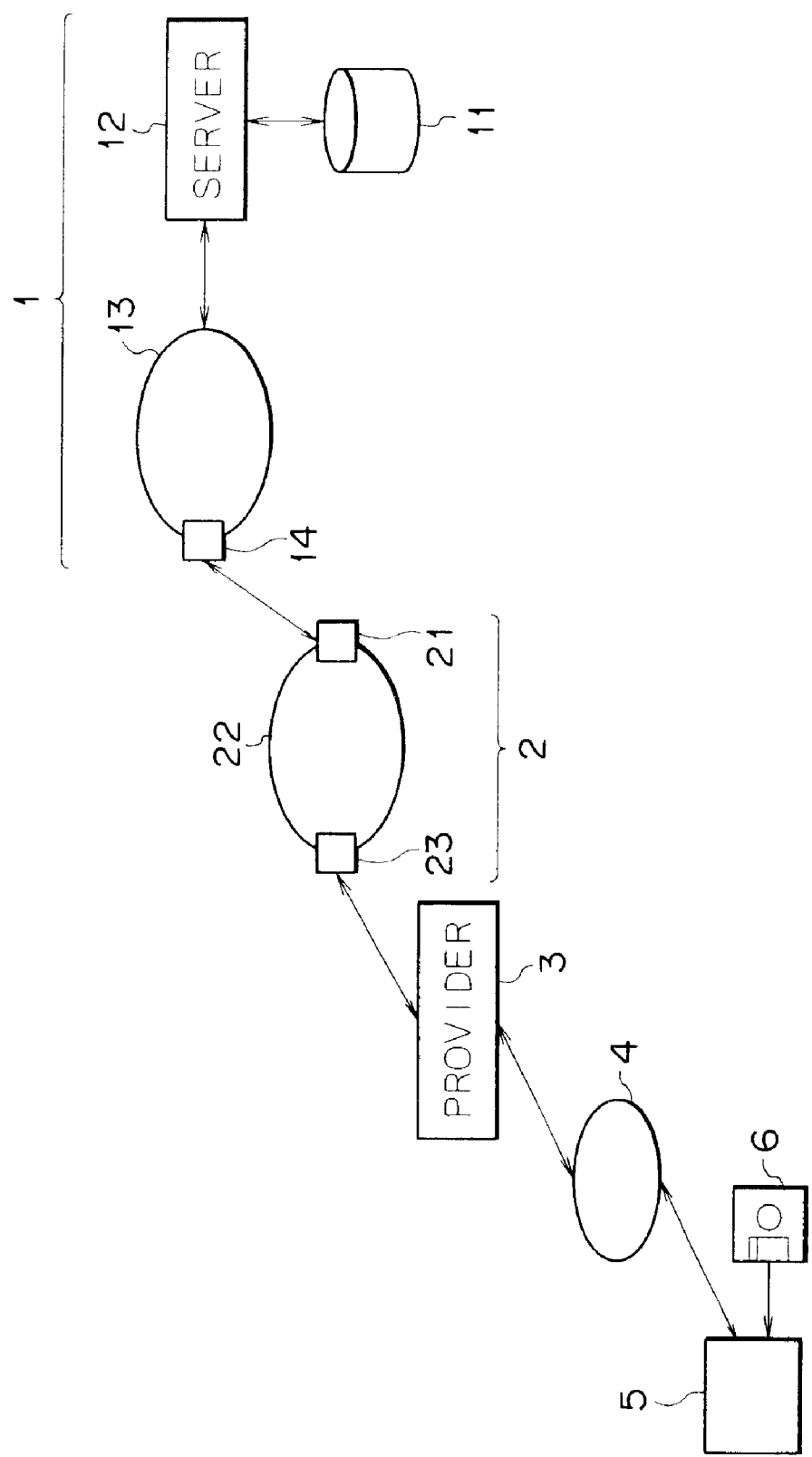
FIG. 2 is a diagram showing the configuration of a typical network system for treating 3-dimensional virtual reality spaces uniformly.

FIG. 2 is a diagram showing a configuration of a typical network system for treating 3-dimensional virtual reality spaces uniformly by applying an information processing apparatus provided by the present invention. In the example shown in the figure, the network system is constituted with major elements such as an in-house network in enterprise 1, the Internet 2, a provider 3, an ISDN (Integrated Services Digital Network) 4 and a client terminal 5 which are connected to each other. It should be noted that, in actuality, a plurality of enterprise networks 1, a plurality of Internets 2, a plurality of providers 3 and a plurality of client terminals 5 may exist in the network system. In order to make the diagram simple, however, only one in-house network in enterprise 1, one Internet 2, one provider 3 and one client terminal 5 are shown in the diagram. In this example, data is communicated between a server 12 in the in-house network in enterprise 1 and the client terminal 5 by way of a LAN (Local Area Network) 13 of the in-house network in enterprise 1, a digital communication line 22 in the Internet 2, the provider 3 and the ISDN 4.

In addition to the LAN 13 and the server 12 which has a hard disc 11, the in-house network in enterprise 1 also includes a gate-way server 14. The server 12 is typically implemented by a server for Community Place (a trademark) provided at vs.sony.co.jp on the Internet by the applicant of this patent. The server 12 controls processing to acquire contents created by the user by means of a content making tool 50 to be described later by referring to FIG. 4 through typically a network and to store the contents in the hard disc 11 locally provided. The contents include graphic data in a VRML file which is described by the user in VRML2.0 to show attributes of a 3-dimensional object or model such as the shape and the position thereof. In addition, a script also known as VRML contents comprising a file or the like is described by the user in a program language such as Java, wherein the script is activated by an operation carried out on the model.

In addition, the server 12 also transmits contents of a 3-dimensional virtual reality space stored in the hard disc 11 to the client terminal 5 which has made a transmission request for the contents by way of the LAN 13, the Internet 2, the provider 3 and the ISDN 4. These communication nodes, including LAN 13, the Internet 2, the provider 3 and the ISDN 4 are referred to hereafter simply as a network, a generic name assigned to them. Furthermore, the server 12 also transmits a program for making contents, that is, the content making tool 50 to be described later by referring to FIG. 4, to the client terminal 5 by way of the network or by means of a recording medium 6 such as a floppy disc.

In addition to the digital communication line 22, the Internet 2 also includes routers 21 and 23.

Figure 3:
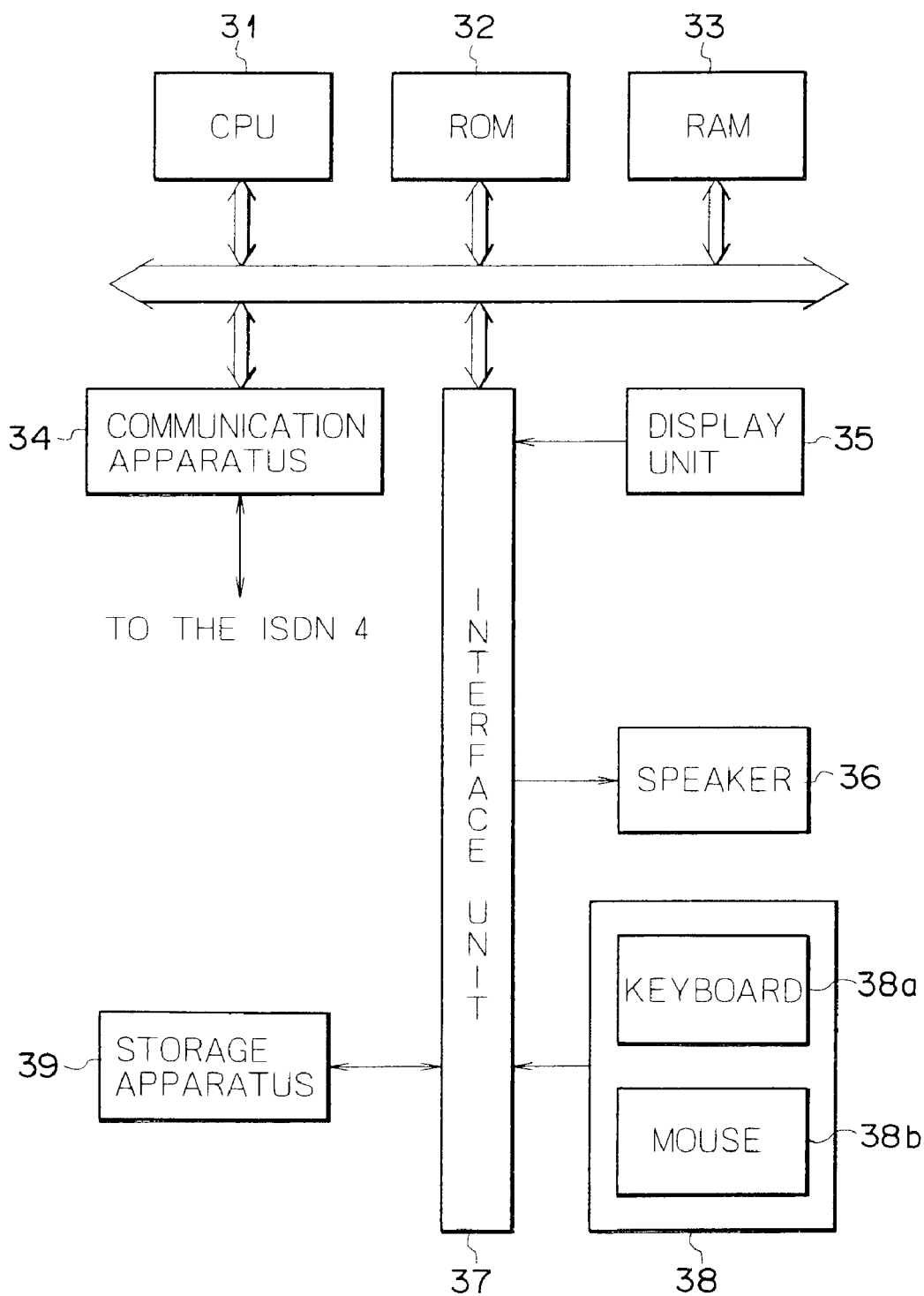
FIG. 3 is a block diagram showing a typical configuration of a client terminal 5 employed in the network system shown in FIG. 2.

FIG. 3 is a block diagram showing a typical configuration of the client terminal 5 employed in the network system shown in FIG. 2. As shown in FIG. 3, the typical configuration of the client terminal 5 includes a CPU 31 for carrying out various kinds of processing by execution of programs stored in a ROM 32 in advance. A RAM 33 is used for temporarily storing information such as data and programs which are required in execution of the various kinds of processing. A communication apparatus 34 exchanges data through the ISDN 4.

Provided typically with a CRT or an LCD, a display unit 35 is capable of displaying a screen such as a 3-dimensional picture of CG (computer graphics) or the like. A speaker 36 is used for outputting an audio signal. A keyboard 38a of an I/O (input/output) unit 38 is operated for entering predetermined inputs represented by characters and symbols. On the other hand, a mouse 38b also of the I/O unit 38 is operated for pointing a specific position such as the position of a specific model. Implemented typically by a hard disc, an optical disc, an MO disc or a floppy disc, a storage apparatus 39 is used for storing the content making tool 50 and various kinds of data. An interface unit 37 serves as an interface for facilitating data exchange between the CPU 31 and the display unit 35, the speaker 36, the I/O unit 38 and the storage apparatus 39.

The client terminal 5 drives the display unit 35 to display VRML contents downloaded from the server 12 employed in the network system shown in FIG. 2 by way of the network and received by a communication apparatus 34.

The content making tool 50 supplied to the client terminal 5 by the server 12 by way of the network or by means of the recording medium 6 is installed in the storage apparatus 39. The content making tool 50 is activated in accordance with an operation carried out by the user to create VRML contents of a 3-dimensional virtual reality space to be uploaded to the server 12 by way of the network or by means of the recording medium 6.

In response to input operations such as a pointing operation carried out by the user on the I/O unit 38 to point to a specific model appearing on the display unit 35, the client terminal 5 also, for example, changes the color of the specific model, activates a script for typically moving the specific model or changes the display contents of a 3-dimensional virtual reality space.

By allowing the user to modify display contents interactively through operations against a model in a 3-dimensional virtual reality space, the client terminal 5 makes the user have a feeling as if the user itself were able to move in the 3-dimensional virtual reality space with the model, to touch the model and to see the model moving and generating sound.

Figure 4:
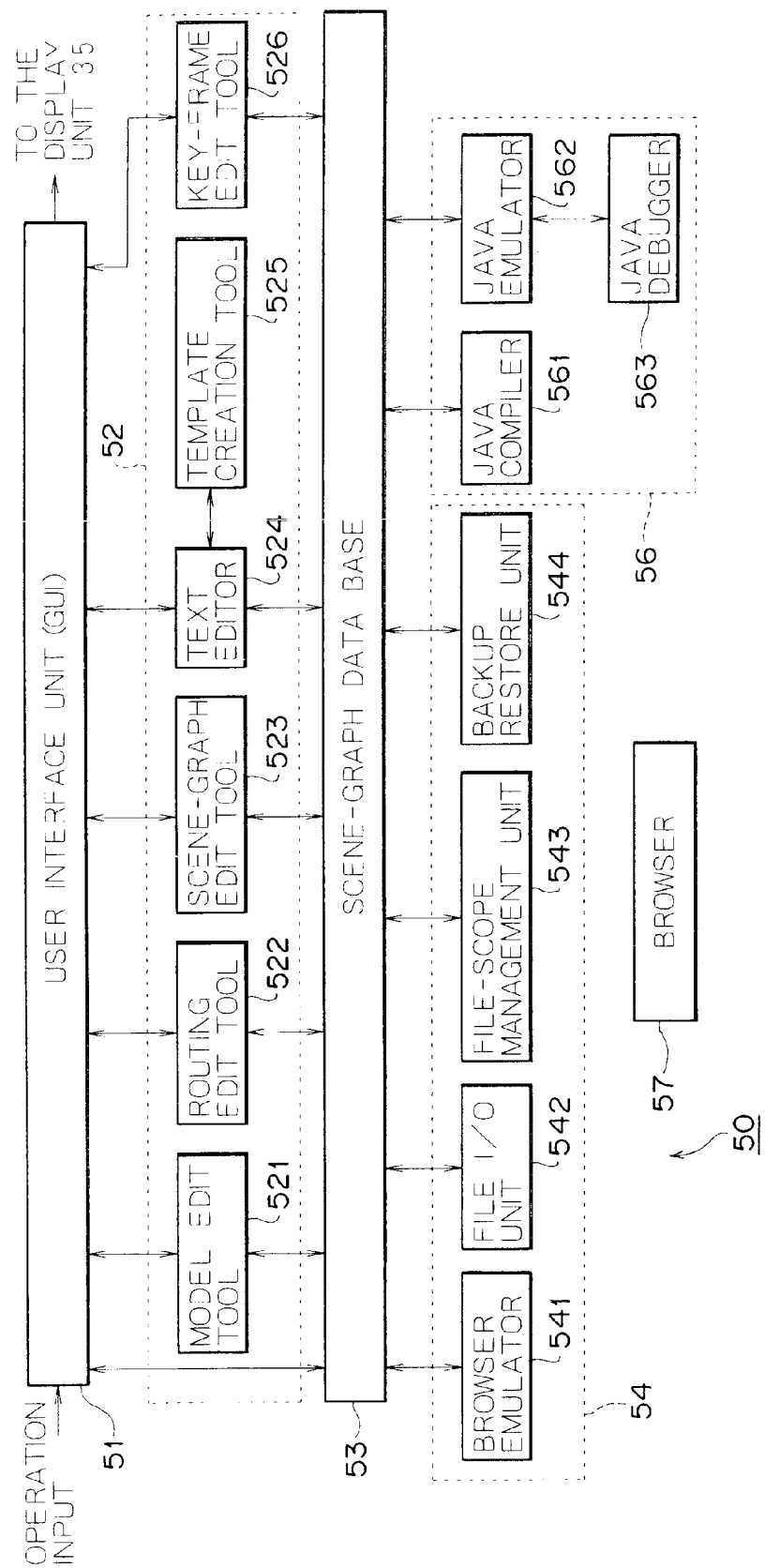
FIG. 4 is a diagram showing a typical configuration of a content making tool 50 operating in the client terminal 5 of FIG. 3 employed in the network system shown in FIG. 2.

FIG. 4 is a diagram showing a typical configuration of the content making tool 50 operating in the client terminal 5 of FIG. 3 employed in the network system shown in FIG. 2. As shown in FIG. 4, the content making tool 50 comprises a user interface unit (GUI: Graphical User Interface) 51, an edit tool 52, a scene-graph database 53, a work tool 54, a script making unit 56 and a browser 57.

The edit tool 52 comprises a model edit tool 521, a routing edit tool 522, a scene-graph edit tool 523, a text editor 524, a template creation tool 525 and a key-frame edit tool 526. The work tool 54 comprises a browser emulator 541, a file I/O unit 542, a file-scope management unit 543 and a backup restore unit 544. The script making unit 56 comprises a Java compiler 561, a Java emulator 562 and a Java debugger 563.

The content making tool 50 is distributed by way of the network or by means of the recording medium 6 to be installed as a software in the storage apparatus 39 employed in the client terminal 5 shown in FIG. 3. The content making tool 50 is executed in the client terminal 5 to facilitate creation of contents by associating model-creation work with interaction-creation work to form an integrated job.

The components constituting the configuration of the content making tool 50 are explained as follows.

The user interface unit 51 drives the display unit 35 shown in FIG. 3 to display a screen for entering various kinds of data used in creation of contents of a 3-dimensional virtual reality space in a window format. In addition, the user interface unit 51 also receives operation input data entered by the user through operations carried out on a variety of buttons on the window displayed on the display unit 35 by using the mouse 38b of the I/O unit 38, or operation input data entered by the user via the keyboard 38a of the I/O unit 38, and supplies necessary data to a variety of tools of the edit tool 52 or the scene-graph database 53. That is to say, the user interface unit 51 provides the user with a GUI environment.

Furthermore, the user interface unit 51 receives display output data from the edit tool 52 or the scene-graph database 53, displaying the data on a predetermined window of the display unit 35. It should be noted that the edit tool 52, the scene-graph database 53 and the work tool 54, that is, the elements composing the configuration of the content making tool 50, are activated in accordance with operation input data received by the user interface unit 51 and executed in accordance with operation input data received from the user interface unit 51.

The edit tool 52 provides the user with functions necessary for creation of graphic data of a model in a 3-dimensional virtual reality space and an instruction program. The model edit tool 521 of the edit tool 52 is used for creating graphic data representing attributes of a model such as the size, the color (or the shape), the position and the behavior of the model by using data for creation of the model entered by the user though operations carried out on a model editing window appearing on the display unit 35. The model edit tool 521 then supplies the created graphic data representing the attributes of the model to the scene-graph database 53. In addition, the model edit tool 521 also displays created graphic data 3-dimensionally or 2-dimensionally at a predetermined position on the model editing window on the display unit 35 through the user interface unit 51.

It should be noted that the model edit tool 521 can also be used for editing graphic data stored in the storage apparatus 39, graphic data read out from the recording medium 6 and graphic data received from the network.

The routing edit tool 522 is used for editing a routing which associates nodes with each other. The nodes include graphic data of a model with a name appended in a scope, scripts or the like. A scope is a VRML file being edited. It should be noted that, in routing work, it is necessary to adjust the types of the attributes or fields of a node at a routing origin with those of a node at a routing destination. An example of the type of a field is SFBool which indicates that the field includes a single logic value.

In the VRML, nodes can be organized hierarchically. The scene-graph edit tool 523 is used for editing the hierarchical structure of a model and an invisible node such as a script node. The hierarchical structure of nodes can be exemplified by a structure composed of a VRML file F5 representing a tree, a VRML file F4 representing the root of the tree created as a hierarchical layer subordinate to the tree VRML file F5 and a VRML file F3 representing the trunk of the tree also created as a hierarchical layer subordinate to the tree VRML file F5, VRML files F2 each representing a branch of the trunk created as a hierarchical layer subordinate to the trunk VRML file F3 and VRML files F1 each representing a leaf on a branch created as a hierarchical layer subordinate to a branch VRML file F2.

Figure 5:
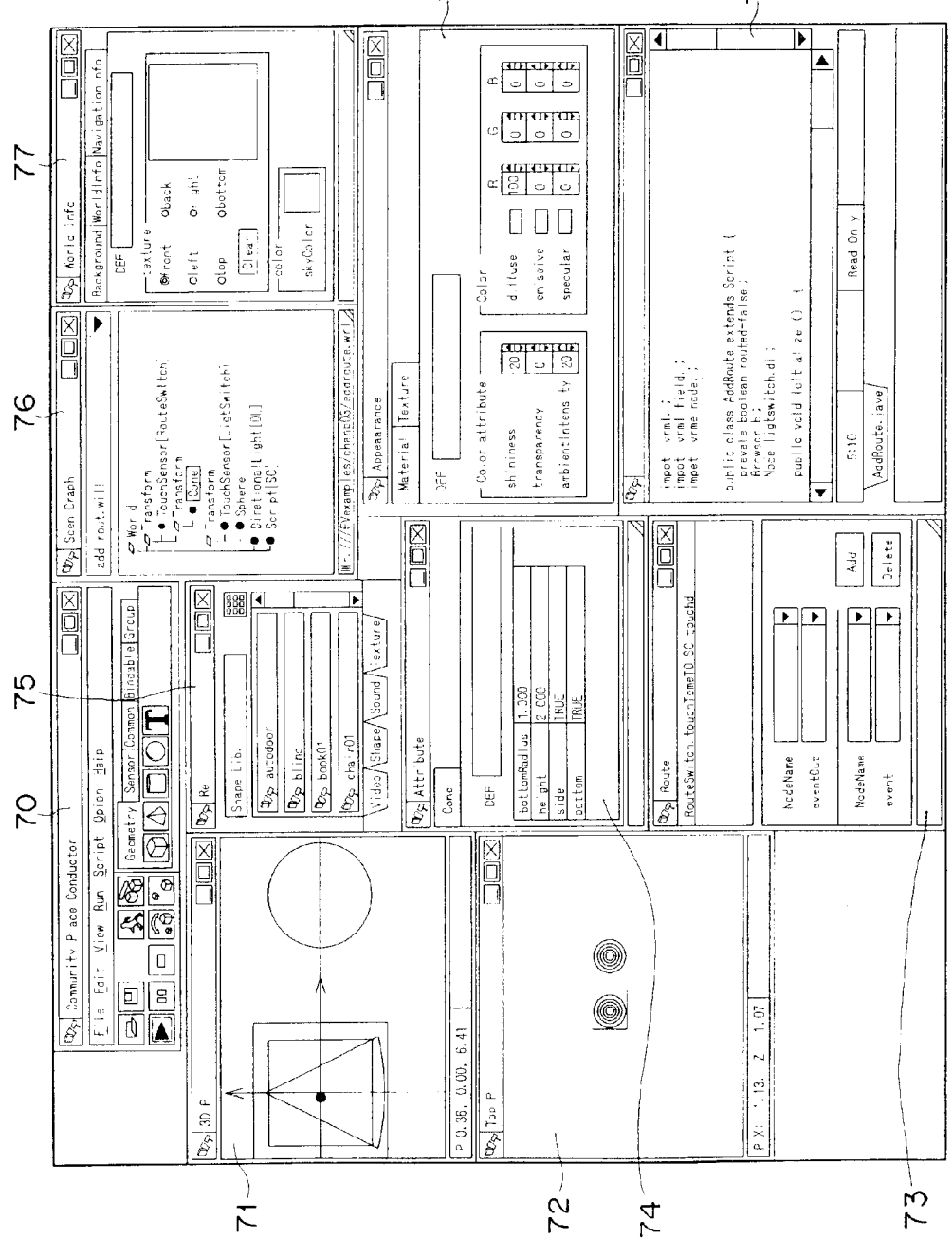
FIG. 5 is a diagram showing an example of a typical menu screen displayed by a user interface unit 51 of the content making tool 50 on a display unit 35 employed in the client terminal 5 as shown in FIG. 4.

When the user selects a VRML file as a current editing object, the scene-graph edit tool 523 displays nodes referred to by the selected VRML file on a scene-graph window 76 shown as part of a menu shown in FIG. 5 in a tree format or as a scene graph. A group of nodes referred to by a VRML file selected as a current editing object in this way is known as a file scope or a current scope. The scene-graph edit tool 523 limits nodes to be edited for such as routing, key framing or creation of a script to the file scope displayed on the scene-graph window 76. In addition, the contents of a file scope, and nodes to be edited, are changed by an operation carried out by the user to change the VRML file to be edited to nodes referred to by a VRML file specified after the change.

The text editor 524 has editor functions of a programing language suitable for creation of scripts written in a language such as Java. The text editor 524 is used for writing a source program of a script and for automatically adding, deleting and updating variables in conjunction with editing work of script nodes.

The template creation tool 525 is a tool for providing convenience to the user. Used in conjunction with the text editor 524, the template creation tool 525 is operated by the user interactively to form a program serving as an primary type of template of a script in accordance with operations carried out by the user on a window called "Script Expert" appearing on the display unit 35. The template is output to the text editor 524. The template creation tool 525 makes it easy to make a script by allowing the user to merely make necessary changes to a source program or a pattern of the script completed to a certain degree by the template creation tool 525 in the form of a template.

The key-frame edit tool 526 is used for creating animation, wherein the state of a model such as the coordinates of the model edited by means of the model edit tool 521 changes on the screen.

The scene-graph database 53 stores data created by the tools of the edit tool 52 in the RAM 33 employed in the client terminal 5 shown in FIG. 3 and manages the data. The scene-graph database 53 provides stored data to the edit tool 52 and the work tool 54 at a high speed in response to a request for such data made by each configuration element of the edit tool 52 and the work tool 54.

The work tool 54 provides the user with functions required for verification of created contents, verification of the operation of a script and the work necessary to create contents such as operations to record and play back data.

Used by the user to verify the operation of created contents, the browser emulator 541 of the work tool 54 is activated when a "Play" button provided on an input screen appearing on the display unit 35 is operated. The activated browser emulator 541 then displays contents stored in the scene-graph database 53 on a screen on the display unit 35 and changes the display contents in accordance with an operation carried out by the user.

That is to say, the browser emulator 541 emulates the operation of the browser 57, displaying the same contents as the case in which the real browser 57 is used. It should be noted that the browser emulator 541 halts its operation when a "Stop" button provided on the input screen or another window is operated. When the browser emulator 541 halts its operation, the user interface unit 51 restores the display back to the input screen.

The file I/O unit 542 records a VRML file with a file-name extension ".wrl" containing graphic data of contents, a file with a file-name extension ".jav" containing a script, a texture file with a file-name extension ".bmp", ".jpg" or ".gif" or a sound file with a file-name extension ".wav" or ".mod" stored in the scene-graph database 53 into the storage apparatus 39 or the recording medium 6. On the contrary, the file I/O unit 542 outputs various kinds of data of contents read out from recording media such as the storage apparatus 39 to the scene-graph database 53.

In the VRML, each file with the file-name extension ".wrl" containing graphic data is provided with a scope, which is a range in which names given to nodes and routings are valid. Names given to nodes and routings are managed in scope units. The file-scope management unit 543 is used for managing names given to nodes in the scene-graph database 53, automatically creating a name to be given to a node and searching for a node. In addition, when a plurality of nodes refer to the same graphic-data file, the file-scope management unit 543 propagates a change made to a graphic-data file to all the nodes referencing the graphic-data file.

When the browser emulator 541 displays a scene which can be operated interactively, the state of a node may be changed by an operation carried out by the user. In this case, the original scene can no longer be displayed unless some treatment is given to the changed scene. The backup restore unit 544 is provided just for restoring the original scene. To put it in detail, the backup restore unit 544 receives and stores the initial state of each node of a scene (that is, a 3-dimensional virtual reality space generated from a VRML file) which is displayed initially on the modeling window when the browser emulator 541 is activated by an operation carried out on the "Play" button. Such initial states are received from the scene-graph database 53.

In addition, when the browser emulator 541 halts its operation because the "Stop" button is pressed, the browser emulator 541 outputs the state of each stored node to the scene-graph database 53. It should be noted that the user interface unit 51 displays a 3-dimensional virtual reality space on a modeling window on the basis of initial states of nodes supplied to the scene-graph database 53.

The script making unit 56 has a function to compile a script created by the user using the text editor 524, a function to verify the operation of the script and a function to debug the script.

To put it in detail, the Java compiler 561 of the script making unit 56 compiles a source program which is written in the Java and stored in the scene-graph database 53, generating an object program to be output to the scene-graph database 53.

The Java emulator 562 and the Java debugger 563 work as an interpreter of a script program written in the Java, allowing the user to verify the operation of the program and to debug it. To be more specific, the Java emulator 562 emulates the operation of the object program of a script stored in the scene-graph database 53 whereas the Java debugger 563 outputs states and errors upon emulation by the Java emulator 562 to the scene-graph database 53.

The browser 57 is implemented typically by a browser for viewing the ordinary WWW with an improvement to give a capability of displaying a 3-dimensional virtual reality space. The browser 57 displays contents of a 3-dimensional virtual reality space read out from the storage apparatus 39 or contents of a 3-dimensional virtual reality space transmitted by the server 12 employed in the network system shown in FIG. 2 on the display unit 35. In addition, the browser 57 displays help files associated with the operations of the configuration elements of the client terminal 5 ranging from the user interface unit 51 to the work tool 54. It should be noted that, as the browser 57, the "Community Place (trademark) Browser" provided by the applicant of this patent can be used.

Next, unique functions of the content making tool 50 are explained. When the user presses the "Play" button displayed on a window of a screen appearing on the display unit 35 by operating the mouse 38b, the browser emulator 541 executes contents made up to this point of time and displays the contents. These operations are referred to as an operation-verification function. It should be noted that the "Play" button will be described later by referring to FIG. 6. This operation-verification function makes it unnecessary to activate the browser 57 for verifying the operation of the contents after the contents have been once saved. In addition, the operation-verification function allows the user to verify the operation of contents so far created by then at any timing during the work to create the contents.

When the user presses the "Play" button to verify the operation, the Java compiler 561 automatically compiles a source program of a script stored typically in a file with a file-name extension ".java" to produce an object program. This operation is referred to as a MAKE function.

The backup restore unit 544 saves the state of contents and the point of sight of the user at the beginning of the operation verification. When the browser emulator 541 halts execution of the contents because the user presses the "Stop" button displayed on a window of a screen appearing on the display unit 35 by operating the mouse 38b, the contents are restored to the state at the beginning of the operation verification, and display contents of a model as well as the point of sight of the user are also restored to their states at the beginning of the operation verification as well. These operations are referred to as a BACKUP RESTORE function.

The user is capable of writing a source program of a script in a program language suitable for creation of the script such as Java by using the text editor 524 and compiling the created source program by means of the Java compiler 561 to produce an object program. These operations are referred to as creation of a script program. Besides the object program is executed to operate contents in the browser 57, the operation of the contents can also be verified using the browser emulator 541 by execution of the object program. In addition, debug code is added to the source program. When the Java emulator 562 is executed, the Java debugger 563 displays, among other things, input/output values of the script, allowing the debugging work of the script to be done. These operations are referred to as a DEBUG function.

When the user interactively sets input/output values of the script node, the template creation tool 525 creates a template of a source program of the script matching with the set values. This operation is referred to as a automatic template creation function. By adding necessary changes to the template using the text editor 524, the user is capable of creating a source program of the script for implementing a desired event with ease. This function makes it unnecessary for the user to do work to write the whole source program of the script by using an editor and prevents a simple coding mistake from being made.

FIG. 5 is a diagram showing a typical menu screen displayed by the user interface unit 51 of the content making tool 50 on the display unit 35 employed in the client terminal 5 shown in FIG. 3. In this example, all windows are displayed on the screen. It is needless to say, however, that only required windows can also be displayed. The windows are explained as follows.

A conductor window 70 is a window for executing control of the content making tool 50. To put it in detail, this window allows new contents to be created, to be fetched or saved, the operation of created contents to be verified and the operation verification to be terminated. In addition, this window further allows a mouse mode to be switched and a model to be added or deleted to mention a few.

On a 3-D view window 71, a 3-D perspective view of an object represented by created graphic data is displayed. The 3-D view window 71 allows the operating mode of a model to be changed or a picture showing a rotation or a movement of a selected model to be displayed. It should be noted that the operating mode of a model can be a rotation, a movement or a visual-point movement.

on a parallel view window 72, a side view, a top view or a wireframe view of a model appearing on the 3-D view window 71 is displayed 2-dimensionally.

A route window 73 is used for editing a routing of an event. The route window 73 will be explained later by referring to FIG. 7.

An attribute window 74 is used for setting attributes of a node undergoing routing and its name on a DEF field. It should be noted that a DEF name can also be set by using a scene-graph window 76 or the route window 73.

A resource library window 75 is used for managing four libraries, namely, a moving picture or a video, the shape of a figure or shape, sound and texture.

On a scene-graph window 76, nodes of a current scope are displayed as a hierarchical layout.

A world-information window 77 is used for setting three different nodes, namely, a background node, a world-information node and a navigation-information node. A background node is set to select a texture and a color of the background of the world-information window 77. On the other hand, setting of the world-information node sets information such as a title, the name of the creator and a date of creation in a VRML file. As for the setting of the navigation-information node, an operation during navigation is determined.

An appearance editor 79 is used for editing a VRML or Java file. In addition, the appearance editor 79 also allows a Java program to be compiled.

Figure 6:
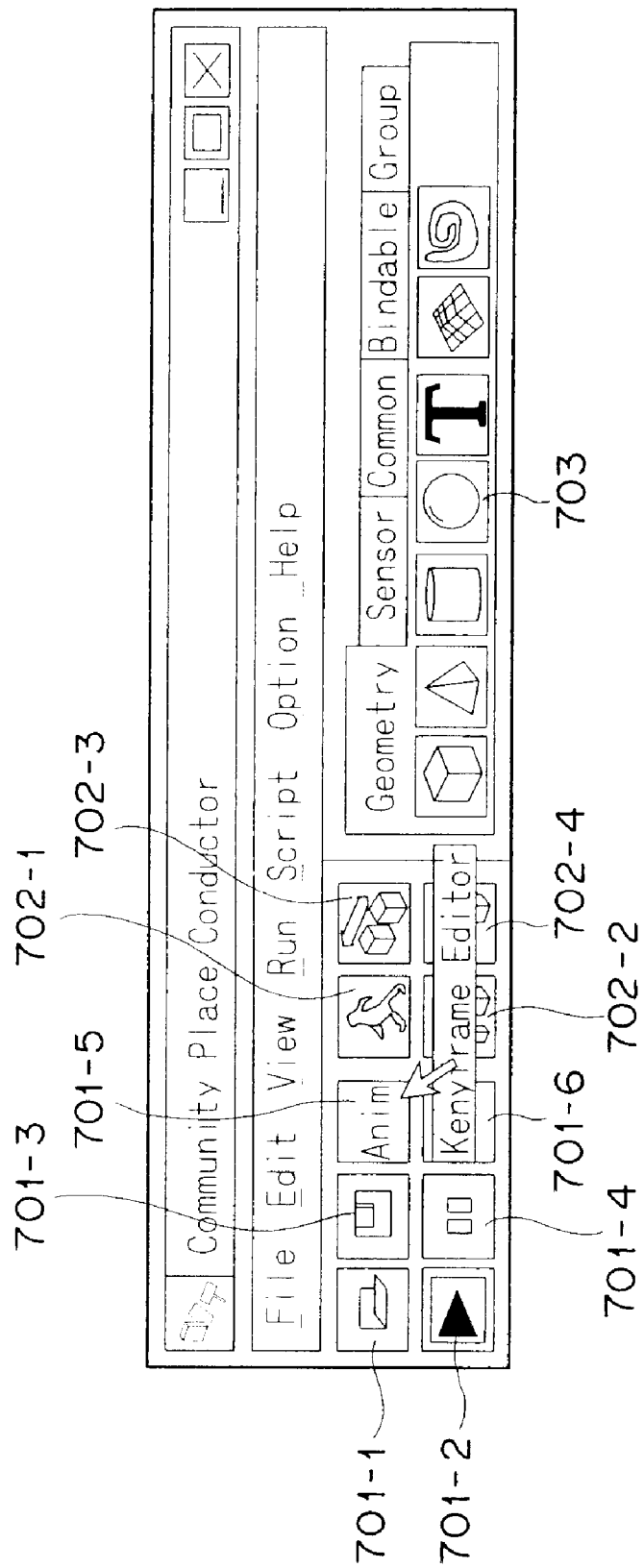
FIG. 6 is a diagram showing a typical configuration of a conductor window 70 displayed on the menu screen on the display unit 35 as shown in FIG. 5.

FIG. 6 is a diagram showing a typical configuration of the conductor window 70 displayed on the menu screen shown in FIG. 5. The conductor window 70 shows several buttons described as follows. A File button 701-1 is operated typically to read out contents stored in the storage apparatus 39 as a file. A Play button 701-2 is operated to establish a simulation mode in which the operation of created contents is verified. A Save button 701-3 is operated to save contents in typically the storage apparatus 39. A Pause button 701-4 is operated to temporarily suspend the operation verification. An Animation button 701-5 is operated to activate a key-frame editor for creating animation or to end the execution of the activated key-frame editor. A Stop button 701-6 is operated to stop the operation verification.

When one of buttons 702-1 to 702-4 is operated, the mouse mode is established. A Navigate button 702-1 is operated to set a mode in which the point of sight is moved within the parallel-view window 72 or the 3-D view window 71. A Rotate button 702-2 is operated to establish a mode in which a model is rotated. A Move button 702-3 is operated to establish a mode in which a model is moved. A Scale button 702-4 is operated to set a scale of a model.

A primitive bar 703 is used to select a node to be added among the following: a geometry node, a sensor node, a common node, a bindable node and a group node.

Figure 7:
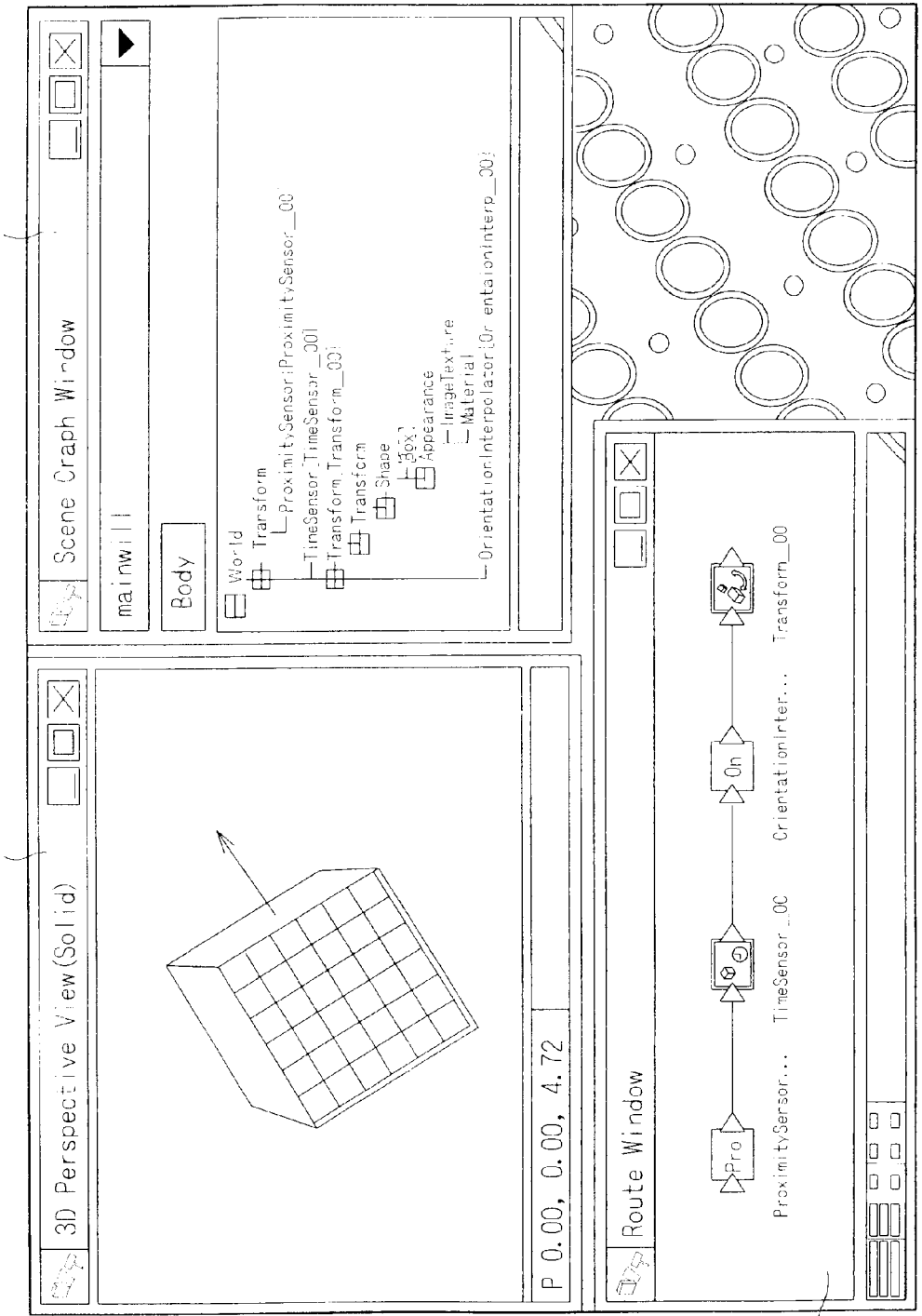
FIG. 7 is a diagram showing a screen on the display unit 35 displaying a typical layout of a 3-D view window 71, a route window 73 and a scene-graph window 76.

FIG. 7 is a diagram showing a screen on the display unit 35 displaying a typical layout of the 3-D view window 71, the route window 73 and the scene-graph window 76. The scene-graph window 76 in this typical display shows a state of a world of a rotating box serving as a model which is seen when the user or the viewer is approaching the model. In this world, a ProximitySensor node, a TimeSensor node and an OrientationInterpolator node are used as main nodes. The ProximitySensor node, the DEF name of which is ProximitySensor__00, is a proximity sensor node. The TimeSensor node, the DEF name of which is TimeSensor__00, is a sensor node concerning time. The OrientationInterpolator node, the DEF name of which is OrientationInterp__00, is an interpolator node for orientation. The route window 73 generates and displays a route from the ProximitySensor__00 node to the TimeSensor__00 node, a route from the TimeSensor__00 node to the OrientationInterpolator node and a route from the OrientationInterpolator node to a Transform node. It should be noted that this world is not specially created by taking a hierarchical structure into consideration. Thus, in this case, the TimeSensor node and the OrientationInterpolator node are put at the top of a scene graph displayed on the scene-graph window 76 as shown in the figure.

Next, a means for synchronizing the movement of a picture with the generation of sound accompanying the picture is explained. In the embodiment of the present invention, as nodes serving as codes to implement 3-dimensional graphics for the synchronization purpose, there are newly prescribed Sony__AudioClip, Sony__TrackControl, Sony__MusicFilter and Sony__MusicNoteInterpolator where the prefix Sony is a trademark.

The Sony__AudioClip node is capable of outputting a reproduced extended module music file and information on tracks specified by the file as an event. The output musical information can be received by a Script node and propagated to another interpolator by way of nodes such as Sony__MusicNoteInterpolator.

The specification of the Sony__AudioClip node is described as follows.
PROTO Sony__AudioClip
[
   exposedField SFString description " "
   exposedField SFBool loop FALSE
   exposedField SFFloat pitch 1.0
   exposedField SFTime startTime 0
   exposedField SFTime stopTime 0
   exposedField MFString url [ ]
   eventOut SFTime duration__changed
   eventOut SFBool isActive
   field MFInt32 eventTracks [ ]
   evetOut MFInt32 musicData
   field MFNode trackControls [ ]
] {
   AudioClip {
     description IS description
     loop IS loop
     pitch IS pitch
     startTime IS startTime
     stopTime IS stopTime
     url IS url
     duration__changed IS duration__changed
     isActive IS isActive
   }
}

In comparison with the conventional AudioClip node, Sony__AudioClip includes extended fields, namely, eventTrack and musicData. The MFInt32 eventTrack field in the above specification specifies the number of a track to be acquired as an event in an MFInt32 format comprising a plurality of 32-bit long integers. On the other hand, the MFInt32 musicData field issues note data specified by the eventTrack field. MFNode TrackControl[ ] of the Sony__AudioClip node is a field for controlling each track of a sound source.

Figure 8:
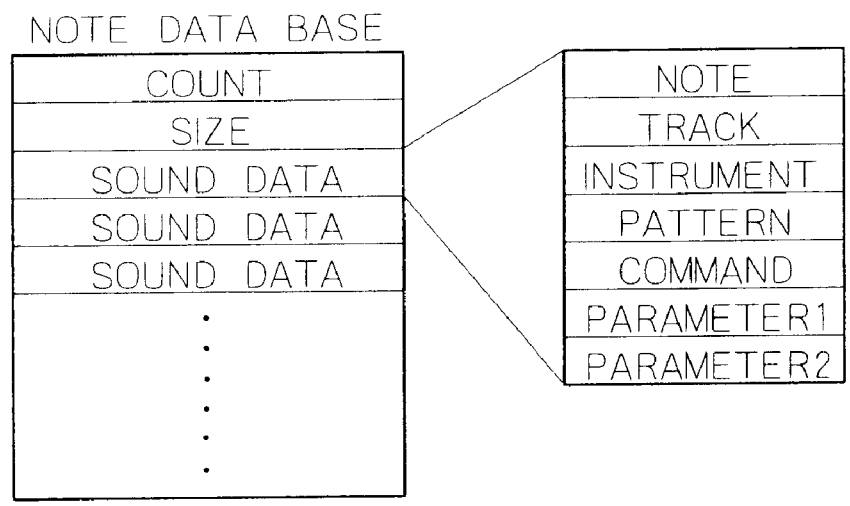
FIG. 8 is an explanatory diagram used for describing the format of note data.

FIG. 8 is an explanatory diagram showing the format of note data. As shown in the figure, the note data is composed of a count, a size and one or more pieces of sound data.; The count indicates the number of pieces of sound data whereas the size represents the size of each piece of sound data, that is, the number of items included in the piece of sound data. Each piece of sound data comprises NOTE, TRACK, INSTRUMENT, PATTERN, COMMAND, PARAMETER1 and PARAMETER2 items. The NOTE item indicates the height of the sound whereas the TRACK item represents the number of the track. The INSTRUMENT and PATTERN items indicate the number of the instrument and the number of the pattern respectively. The COMMAND item represents Effect Command, the name of a field used if necessary. By the same token, the PARAMETER1 and PARAMETER2 items represent Effect Command Parameter1 and Effect Command Parameter2 respectively which are names of fields used when necessary.

As a track with the number thereof specified by the "field MFInt32 eventTrack" field, a track of a MIDI (Musical Instrument Digital Interface) file can be specified.

Figure 9:
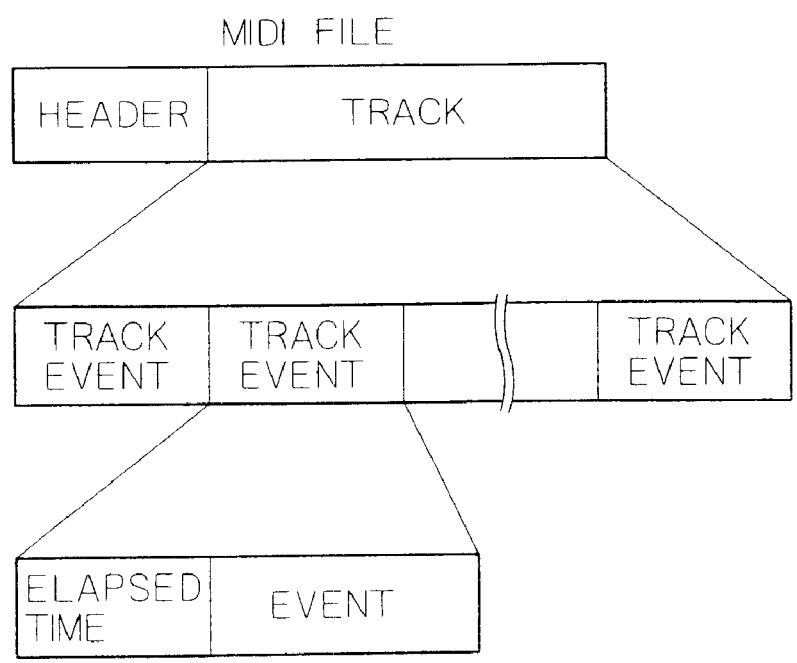
FIG. 9 is an explanatory diagram used for. describing the structure of a MIDI file.

FIG. 9 is an explanatory diagram showing the structure of a MIDI file. As shown in the figure, a MIDI file is composed of a header and a track. A track comprises any arbitrary number of track events. Each track event is composed of a lapsed time and an associated event. A lapsed time is a period of time between generation of an event preceding this associated event and the generation of this associated event.

Consider an example shown in FIG. 10. As shown in the figure, for a first track event, a lapsed time N and an event "do" are prescribed and, for a second track event, a lapsed time 2N and an event "re" are prescribed. Finally, for a third track event, a lapsed time N and an event "mi" are prescribed. The first event "do" is generated with timing of the lapse of the period N since the generation of a predetermined event preceding the first event. By the same token, the second event "re" is generated with timing of the lapse of the period 2N since the generation of the first event and the third event "mi" is generated with timing of the lapse of the period N since the generation of the second event.

It should be noted that the lapsed time is measured with 1/N of the length of a crotchet used as a unit. The value of N is variable, representing the resolution. That is to say, the lapsed time N is equal to the length of a crotchet. When used in combination with a "tempo" which expresses the length of a crotchet in terms of milliseconds, the lapsed time in a MIDI file can be converted into a lapsed time in the real world by the following equation:

$$\text{Real time} = \text{Lapsed time} \times \text{Resolution} \times \text{Tempo}$$

Data is exchanged in the MIDI in message units. A MIDI message is composed of a status byte indicating the type of the message and data bytes occupied by actual data. As shown in FIG. 11, the status byte has an MSB of 1 while a data byte has an MSB of 0.

FIG. 12 is a table showing message types as well as the status and the data bytes of each message type.

MIDI messages can be classified into 2 large categories, namely, channel messages each for delivering independence performance information for each MIDI channel and system messages each for controlling a MIDI connected system as a whole. A channel message is used for delivering information of up to 16 different performance parts which are distinguished from each other by the 4 low-order bits of the status byte used for specifying MIDI channels 1 to 16. The 4 high-order bits of the status byte represent the type of the message.

The channel messages are further classified into 2 categories, namely, a voice message for controlling sound or voice of the receiver side and a mode message for specifying how a voice message is to be received on the receiver side.

The system messages are further classified into an exclusive message, a common message and a real-time message. A common message is valid for all apparatuses connected to the MIDI system. A real-time message conveys information such as the start and the stop of a performance such as a sequencer. A real-time message may be a message related to synchronization. Used for transferring mainly a tone and setting data, an exclusive message comprises a status byte, an ID of a manufacturer following the status byte and any arbitrary number of data bytes following the ID. An exclusive message is terminated with a code indicating an end of the exclusive message.

The format of data with an arbitrary length following the ID in the exclusive message is prescribed by the manufacturer identified by the ID.

As a note of note data shown in FIG. 8, typically, a note (information on the height of sound) of this MIDI file can be specified.

The following is an example of generating an event from tracks #1 and #2 by reproduction of sound prescribed in a file named file.xm by using Sony_AudioClip.

```
DEF SAC Sony_AudioClip {
    url "file.xm"
    eventTrack [1 2]
}
DEF SC Script {
    :
    eventIn musicData
    :
}
ROUTE SAC.musicData TO SC.musicData
```

A Script node reacting to an event generated from Sony_AudioClip can be described as follows.

```
public void processEvent(Event e) {
    if(e.getName( ).equals("musicData")) {
        ConstMFInt32 mfi32=(ConstMFInt32) e.getValue( );
        // Acquire an event
        int ndata=mfi32.getSize( );
        int aNotes[ ]=new int [nData];
        mfi32.getValue(aNotes);
        int track=0;
        int note 0;
        int nCounts=aNotes[0];
        int nSize=aNotes[1];
        for(int i=2; i<nCounts; I+=nSize) {
            note=anotes[i+0]; // Acquire a note
            track=aNotes[i+1]; // Acquire a track number
            switch(track) {
                :
                (Actual processing)
                :
```

The Sony_TrackControl node is a node for controlling, among other things, the volume of the sound and the pan for each track of a sound source generated by the Sony_AudioClip node. The specification of the Sony_TrackControl node is prescribed as follows

```
PROTO Sony_TrackControl
[
    field MFInt32 tracks[ ]
    exposedField SFFloat intensity 1.0
    exposedField SFInt32 pan 0.5
] {
{
```

A "field MFInt32 tracks [ ]" field in the Sony_TrackControl node specifies the number of track to be controlled by the node.

An "exposedField SFFloat intensity" field gives a sound volume in the range 0.0 to 1.0 to a track with the number thereof specified by field MFInt32 tracks.

An "NexposedField SFInt32 pan" field gives a pan in the range 0.0 to 1.0 to a track with the number thereof specified by field MFInt32 tracks. In this example, a pan of 0.5 at the center of the range is specified.

The following is an example in which the sound volume of track #1 is changed when an event is received from intensity_changed of an SC (script node) by using Sony_TrackControl.

```
Sony_AudioClip {
    url "file.xm"
    trackControl [
        DEF Track0 Sony_TrackControl {
            track [0]
        }
        DEF Track1 Sony_TrackControl {
            track [1]
        }
    ]
}
DEF SC Script {
    :
    eventOut SFFloat intensity_changed
    :
}
ROUTE SC.intensity_changed TO Track1.intensity
```

The Sony_MusicFilter node is capable of picking out a specific track from a Sony_AudioClip node with a specified extended module music file and manipulating the sound volume or the like of the track independently of other tracks. Much like AudioClip, it can be used as a sound source of a Sound node. The specification of a Sony_MusicControl node is prescribed as follows.

```
PROTO Sony_MusicFilter
[
    field SFNode audioclip
    field MFInt32 tracks [ ]
    exposedField SFFloat intensity 1.0
    exposedField SFFloat pan 0.5
] {
}
```

A "field SF Node audioclip" field in this node specifies Sony_AudioClip to be processed by Sony_MusicFilter.

A "field MFInt32 tracks [ ]" field specifies the number of a track to be controlled (sound-generated) by this filter.

An "exposedField SFFloat intensity" field gives a sound volume in the range 0.0 to 1.0 to a track with the number thereof specified by field MFint32 tracks.

An "exposedField SFFloat pan" field gives a pan in the range 0.0 to 1.0 to a track with the number thereof specified by field MFInt32 tracks.

The following is an example in which, with a first Sound node, only tracks #2 and #3 of a file named file.xm are sound-generated and, with a second Sound node, only track #0 of the file file.xm is sound-generated by using Sony_MusicFilter.

```
Sound {
   source Sony_MusicFilter {
      audioclip DEF AC Sony_AudioClip {
         url "file.xm"
      }
      tracks [2 3]
   }
}
Sound{
   soure Sony_MusicFilter {
      audioClip AC
      tracks [0]
   }
}
```

The Sony_MusicNoteInterpolator node accepts an event of the "eventOut MFInt32 musicData" format generated by Sony_AudioClip and performs SFFloat-value mapping on the note, that is, the sound height of a specified track. The specification of the Sony_MusicNoteInterpolator node is prescribed as follows.

```
PROTO Sony_MusicNoteInterpolator
[
eventIn MFInt32 musicData
exposedField SFInt32 track −1
exposedField MFInt32 key [ ] # The range of the note.
exposedField MFFloat keyValue [ ] # Assigned value.
eventOut SFFloat value_changed
]
{
}
```

An "eventIn MFInt32 musicData" field of this node receives an input event of a format output by Sony_Audioclip.

An "exposedField SFInt32 track" field specifies the number of track of interest.

An "exposedField MFInt32 key" field specifies a reacting height of sound.

An "exposedField MFFloat keyValue" field specifies an assigned number.

An "eventOut SFFloat fraction_changed" field outputs a result of the mapping of musicData.

The following is an example in which a color is changed in a reaction to a sound tone by using Sony_MusicNoteInterpolator.

```
DEF S_AC Sony_AudioClip {
   eventTrack [0 2]
}
DEF S_MNI Sony_MusicNoteInterpolator {
   track 2
   key [0 12]
   keyValue [0.0 1.0]
}
DEF ColorIP ColorInterplator {
   key [0.0 1.0]
   keyValue [1.0 0.0 0.0, 0.0 0.0 1.0]
}
:
appearance Appearance {
   material DEF CONE_MATERIAL { }
}
:
ROUTE S_AC.musicData TO S_MNI.musicData
ROUTE S_MNI.value_changed TO ColorIP.set_fraction
ROUTE ColorIP.value_changed TO CONE_MATERIAL.set_diffuseColor
```

Figure 13:
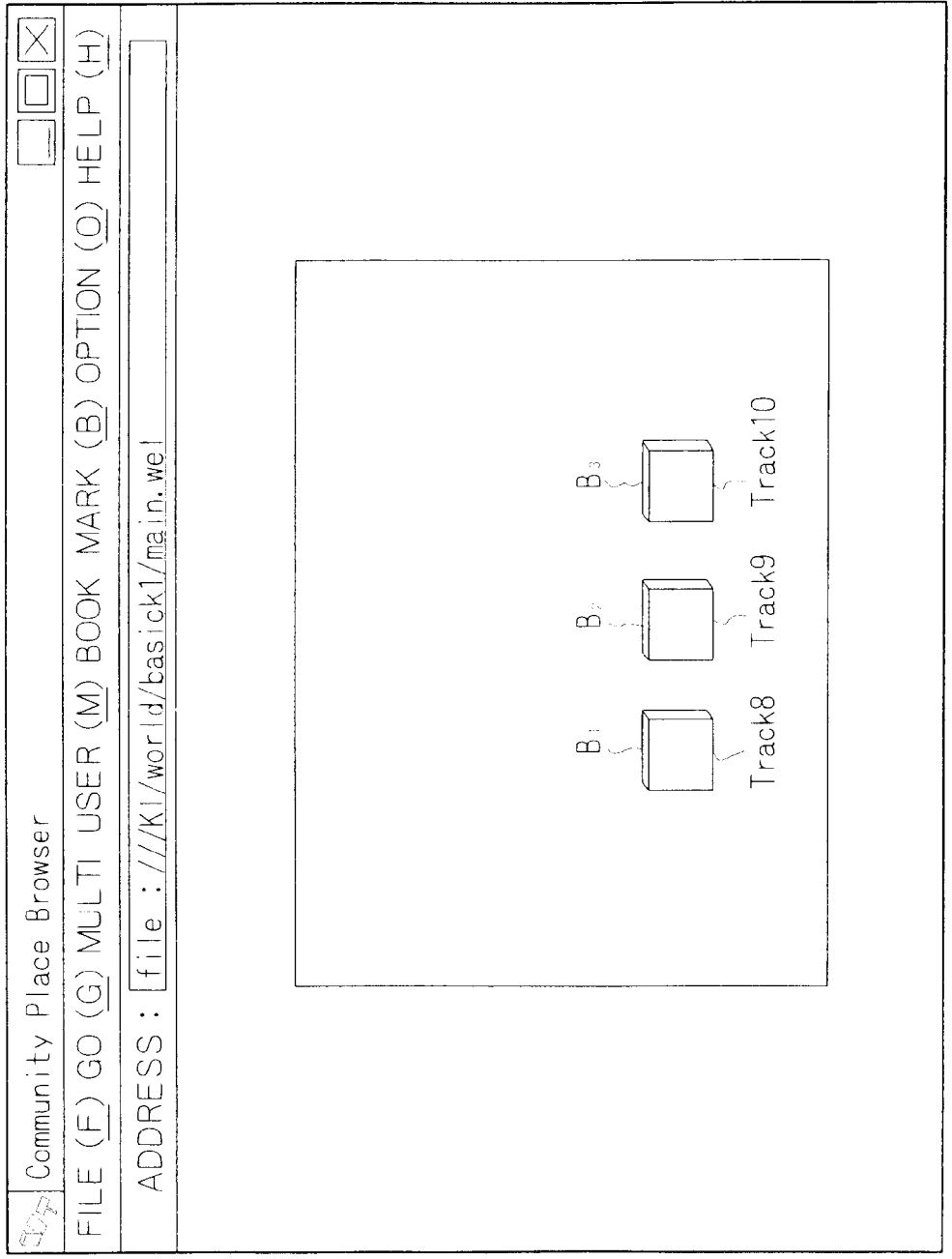
FIG. 13 is a diagram showing an example in which positions and colors of boxes change in synchronization with generation of a sound.
Figure 14:
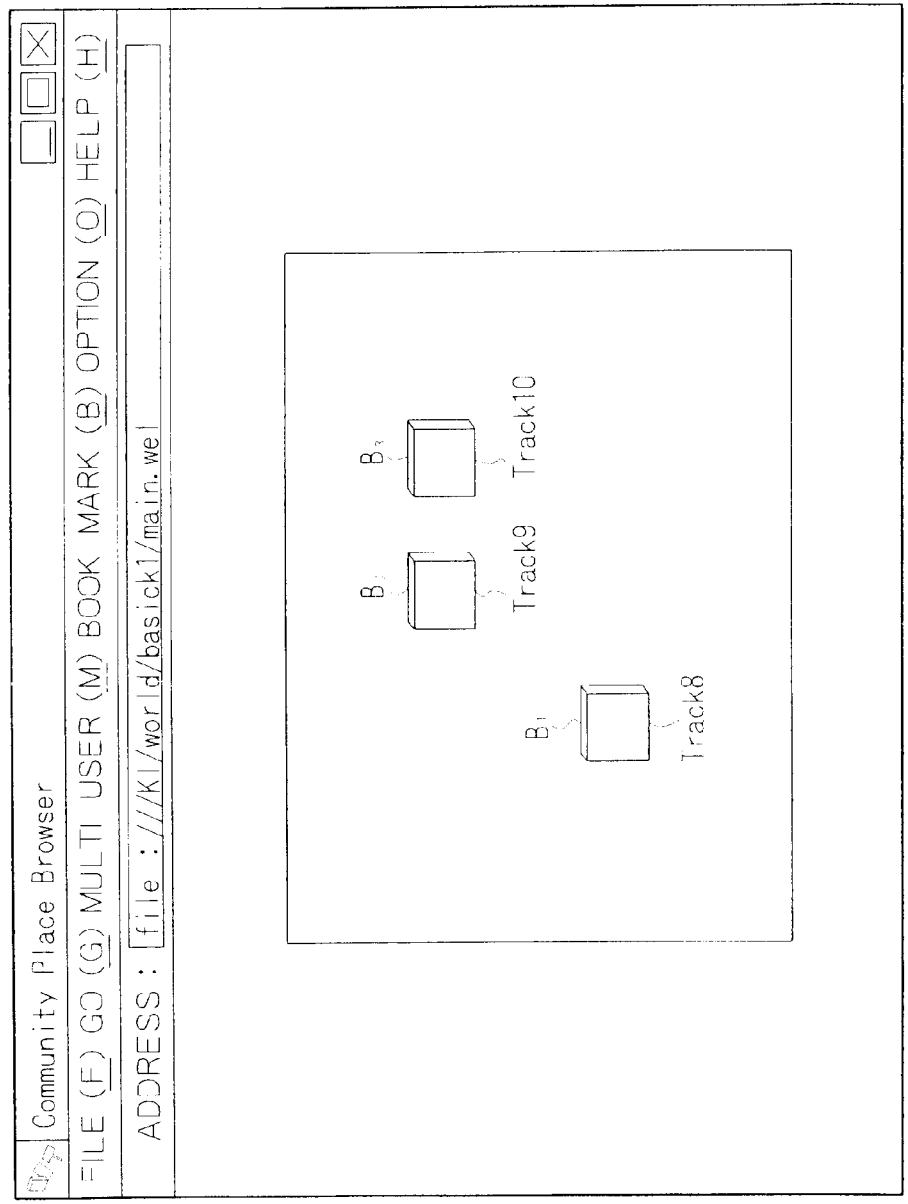
FIG. 14 is a diagram showing the example in which positions and colors of the boxes change in synchronization with generation of a sound.
Figure 15:
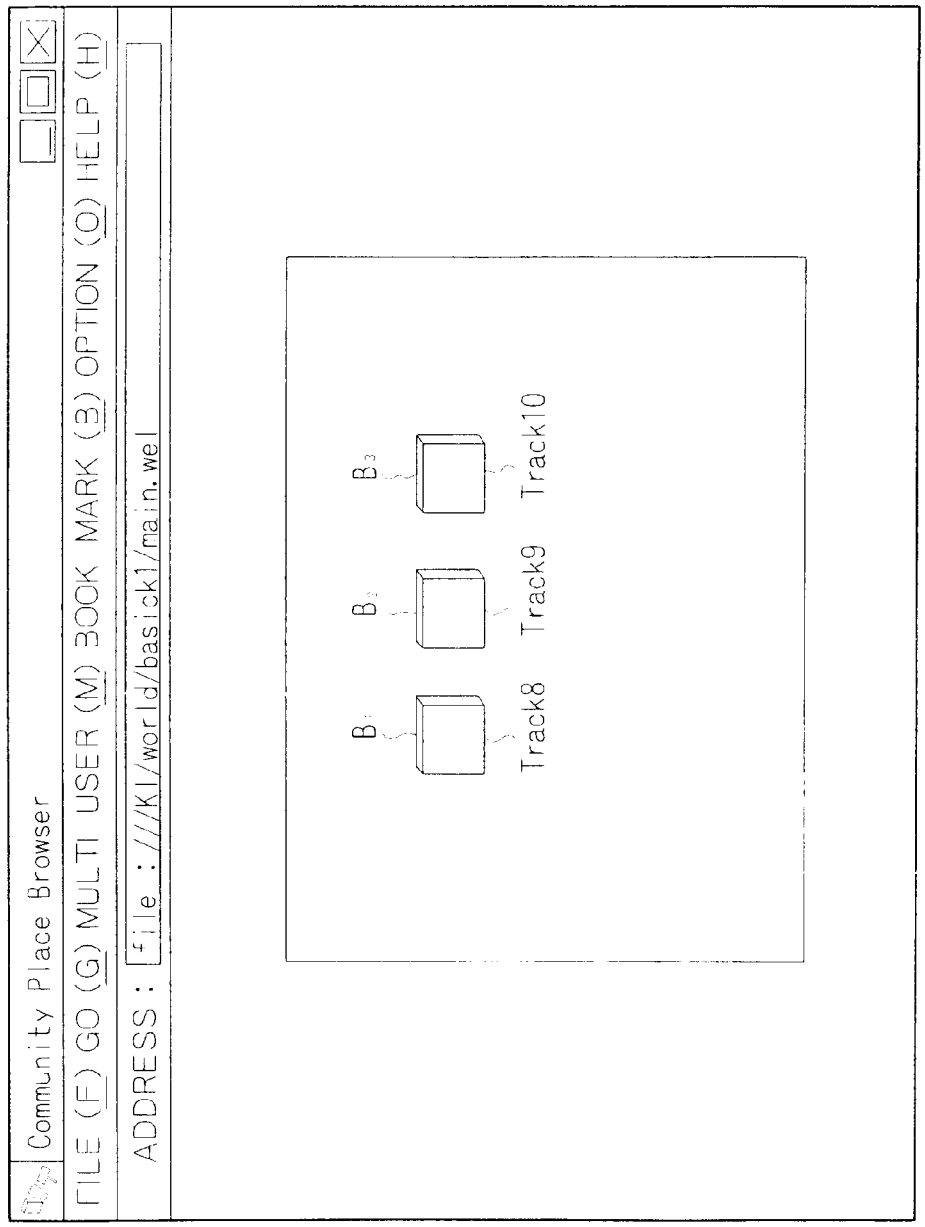
FIG. 15 is a diagram showing the example in which positions and colors of the boxes change in synchronization with generation of a sound.

The following is a description of an example in which track 8 to track 10 each serving as a sound source are associated respectively with boxes $B_1$ to $B_3$ displayed on the screen and, when a sound such as a drum sound is generated from each of tracks 8 to 10, the positions and the colors of the respective boxes $B_1$ to $B_3$ are changed in synchronization with the generation of the sound with reference to FIGS. 13 to 15. FIG. 13 is a diagram showing an initial state prior to generation of a sound. FIG. 14 is a diagram showing a state in which, sounds are generated from tracks 9 and 10 and the positions and the colors of the boxes $B_2$ and $B_3$ are then changed in synchronization with the generation of the sounds by tracks 9 and 10. FIG. 15 is a diagram showing a state in which, all is clicked and, then, the positions and the colors of the boxes $B_1$ to $B_3$ are then changed in synchronization with the generation of the sounds by tracks 8 to 10.

A typical program to be executed for carrying the processing described above is described as follows.

```
# VRML V2.0 utf8.
# An event is generated from Sony_AudioClip.
# The position and the color of BOX are changed synchro-
   nously
# with generation of sound.
Definition of Sony_AudioClip.
PROTO Sony_AudioClip
[
exposedField SFString description " "
exposedField SFBool loop FALSE
exposedField SFFloat pitch 1.0
exposedField SFTime startTime 0
exposedField SFTime stopTime 0
exposedField MFString url [ ]
eventOut SFTime duration_changed
eventOut SFBool isActive
field MFInt32 eventTracks [ ]
# A field specifying a track fetching an event.
eventOut MFInt32 musicData
# An event generation field.
field MFNode trackControls [ ]
# A field for controlling of each track.
] {
   AudioClip {
      description IS description
      loop IS loop
      pitch IS pitch
      startTime IS startTime
      stopTime IS stopTime
      url IS url
      duration_changed IS duration_changed
      isActive IS isActive
   }
}

#A Script node for converting an event generated by
#Sony_AudioClip into a VRML scene.
DEF SC Script{
   url "Nineth.class"
   eventIn MFInt32 musicData
   # A field receiving an output of Sony_AudioClip.
```

```
eventOut SFTime track8
# A field in which a converted event is generated.
eventOut SFTime track9
# A field in which a converted event is generated.
eventOut SFTime track10
#A field in which a converted event is generated.
}
# Time sensors for controlling the interpolators.
# in this example, the time sensors are activated by
# events generated in accordance with sound data.
DEF TS_8 TimeSensor {cycleInterval 0.5 loop FASLE}
DEF TS_9 TimeSensor {cycleInterval 0.5 loop FALSE}
DEF TS_10 TimeSensor {cycleInterval 0.5 loop FALSE}
# Interpolators for changing colors.
DEF CI_8 ColorInterpolator {
   key [0 0.5 1]
   keyValue [0.5 0.5 0.5, 1 0 0, 0.5 0.5 0.5]
}
DEF CI_9 ColorInterpolator {
   key [0 0.5 1]
   keyValue [0.5 0.5 0.5, 0 1 0, 0.5 0.5 0.5]
}
DEF CI_10 ColorInterpolator {
   key [0.5 1]
   keyValue [0.5 0.5 0.5, 0 0 1, 0.5 0.5 0.5]
}
#Interpolators for changing positions.
DEF PI_8 PositionInterpolator {
   key [0 0.2 1]
   keyValue [-1 0 1, -1 4 1, -1 0 1]
}
DEF PI_9 PositionInterpolator {
   key [0 0.2 1]
   keyValue [0 0 1, 0 4 1, 0 0 1]
}
DEF PI_10 PositionInterpolator
   key [0 0.2 1]
   keyValue [1 0 1, 1 4 1, 1 0 1]
}
# - - -
Transform {
   children[
      Sound{
         source DEF SAC_AudioClip {
            # Tracks 8, 9 and 10 of music.mid are each
            # specified as a track from which an event
            # is to be acquired.
            eventTracks [8 9 10]
            # Specifies tracks for events.
            loop TRUE
            URL "music.mid"
         }
      }
      # BOX changing with Track 8.
      DEF POS_8 Transform {
         translation -1 0 1
         children [
            Shape {appearance Appearance {
               material DEF OBJ_8 Material{diffuseColor 1 1
                  1} }
               geometry Box {size 0.5 0.5 0.5}
            }
         ]
      }
      # BOX changing with Track 9.
      DEF POS_9 Transform {
         translation 0 0 1
         children [
            Shape {appearance Appearance {
               material DEF OBJ_9 Material{diffuseColor 1 1
                  1} }
               geometry Box {size 0.5 0.5 0.5}
            }
         ]
      }
      #BOX changing with Track 10.
      DEF POS_10 Transform {
         translation 1 0 1
         children [
            Shape {appearance Appearance {
               material DEF OBJ_10 Material{ diffuseColor 1
                  1 1} }
               geometory Box {size 0.5 0.5 0.5}
            }
         ]
      }
]
}
# Data from Sony_AudioClip is passed to the Script node.
ROUTE SAC.musicData TO SC.musicData
# The Script node issues an event with a component of Track
   8
# used as a source.
# A time sensor activated to accompany it changes the box.
ROUTE SC.track8 TO TS_8.startTime
ROUTE TS_8.fraction_changed TO CI_8.set_fraction
ROUTE CI_8.value_changed To OBJ_8.diffuseColor
ROUTE TS_8.fraction_changed TO PI_8.set_fraction
ROUTE PI_8.value_changed To POS_8.taranslation
# The Script node issues an event with a component of Track
   9
# used as a source.
# A time sensor activated to accompany it changes the box.
ROUTE SC.track9 TO TS_9.startTime
ROUTE TS_9.fraction_changed TO CI_9.set_fraction
ROUTE CI_9.value_changed To OBJ_9.diffuseColor
ROUTE TS_9.fraction_changed TO PI_9.set_fraction
ROUTE PI_9.value_changed To POS_9.taranslation
# The Script node issues an event with a component of Track
   10
# used as a source.
# A time sensor activated to accompany it changes the box.
ROUTE SC.track10 To TS_10.startTime
ROUTE TS_10.fraction_changed TO CI_10.set_fraction
ROUTE CI_10.value_changed To OBJ_10.diffuseColor
ROUTE TS_10.fraction_changed TO PI_10.set_fraction
ROUTE PI_10.value_changed TO POS_10.translation
End
```

Figure 16:
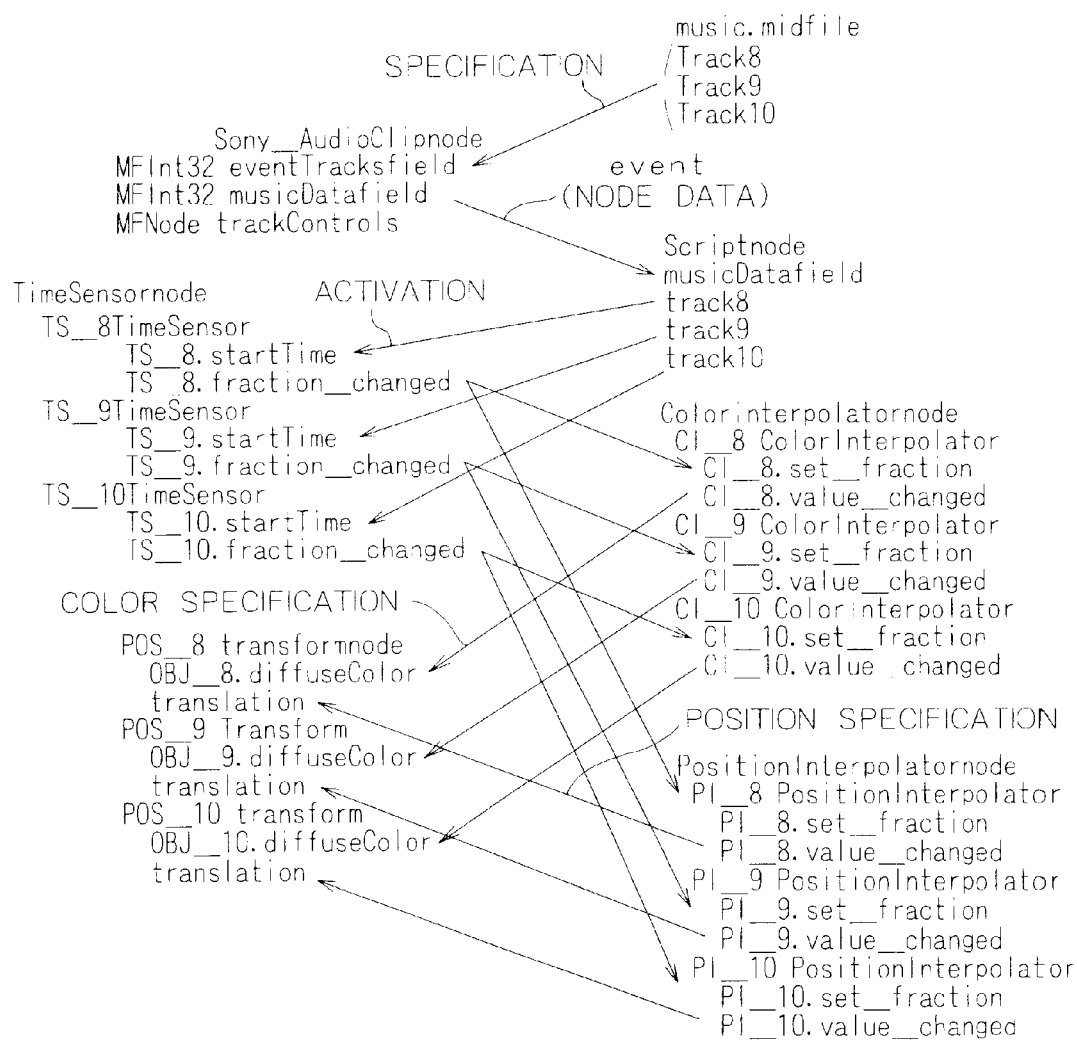
FIG. 16 is an explanatory diagram used for describing exchanges of events among nodes used in the example shown in FIGS. 13 to 15.

FIG. 16 is a diagram showing relations among nodes in an example where the position and the color of boxes change in synchronization with the generation of a sound. The "MFInt32 eventTracks" field of the Sony_AudioClip node specifies to fetch data of tracks 8 to 10 of the music.mid file as an event. Thus, the Sony_AudioClip node is capable of knowing when sound of tracks 8 to 10 will be generated. The processing to generate sound corresponding to MIDI data stored in these tracks 8 to 10 itself is carried out by the browser 57 by reading out data of the music.mid file.

The MFInt32 musicData field of the Sony_AudioClip node collects the events (note data) of the Sony_AudioClip node and supplies them to the musicData field of the Script node. The Script node disassembles the data of tracks 8 to 10. Then, typically, TS_8 Time Sensor in the TimeSensor node is started by setting the present time in a TS_8.start.Time field. When activated, the TS_8 TimeSensor node operates for a period of time set in advance. Assume that an operation start time and an operation end time are set at 0 and 1 respectively. TS_8.fraction_changed field outputs a lapsed time in the range 0 to 1 since the operation start time to a CI_8.set_fraction field of CI_8 ColorInterpolator in a ColorInterpolator node and a PI_8.set_fraction field of PI_8 PositionInterpolator in a PositionInterpolater node.

CI_8 ColorInterpolator prescribes a color for an input value of 0 and a color for an input value of 1 in advance. In addition, CI_8 ColorInterpolator also prescribes a color for a number between of 0 and 1 in advance. A CI_8.value_changed field outputs data of a color corresponding to a number in the range of 0 to 1 supplied from a TS_8.fraction_changed field. The output data of this color is supplied to an OBJ_8.diffuseColor field of a POS_8 Transform node. This field sets the color of box B$_1$ to the specified color.

The processing described above is carried out in advance so as to be in time before sound of track 8 is generated by the browser 57. As a result, the browser 57 changes the color of box B$_1$ as shown in FIGS. 13 to 15 in synchronization with a sound output and reproduced from track 8 of the music.mid file.

By the same token, a PI_8 PositionInterpolator node prescribes a position for an input value of 0 and a position for an input value of 1 in advance. In addition, PI_8 ColorInterpolator node also prescribes a position for a number between of 0 and 1 in advance. A PI_8.value_changed field outputs data of a position corresponding to a number in the range of 0 to 1 supplied from a TS_8.fraction_changed field. The output data of this position is supplied to a translation field of a POS_8 Transform node. As a result, the browser 57 changes the position of box B$_1$ as shown in FIGS. 13 to 15 in synchronization with a sound output and reproduced from track 8 of the music.mid file.

In the above description, the color and the position of box B$_1$ are explained. By the same token, the colors and the positions of box B$_2$ or B$_3$ are changed in synchronization with generation of sounds from track 9 or 10 respectively.

Figure 17:
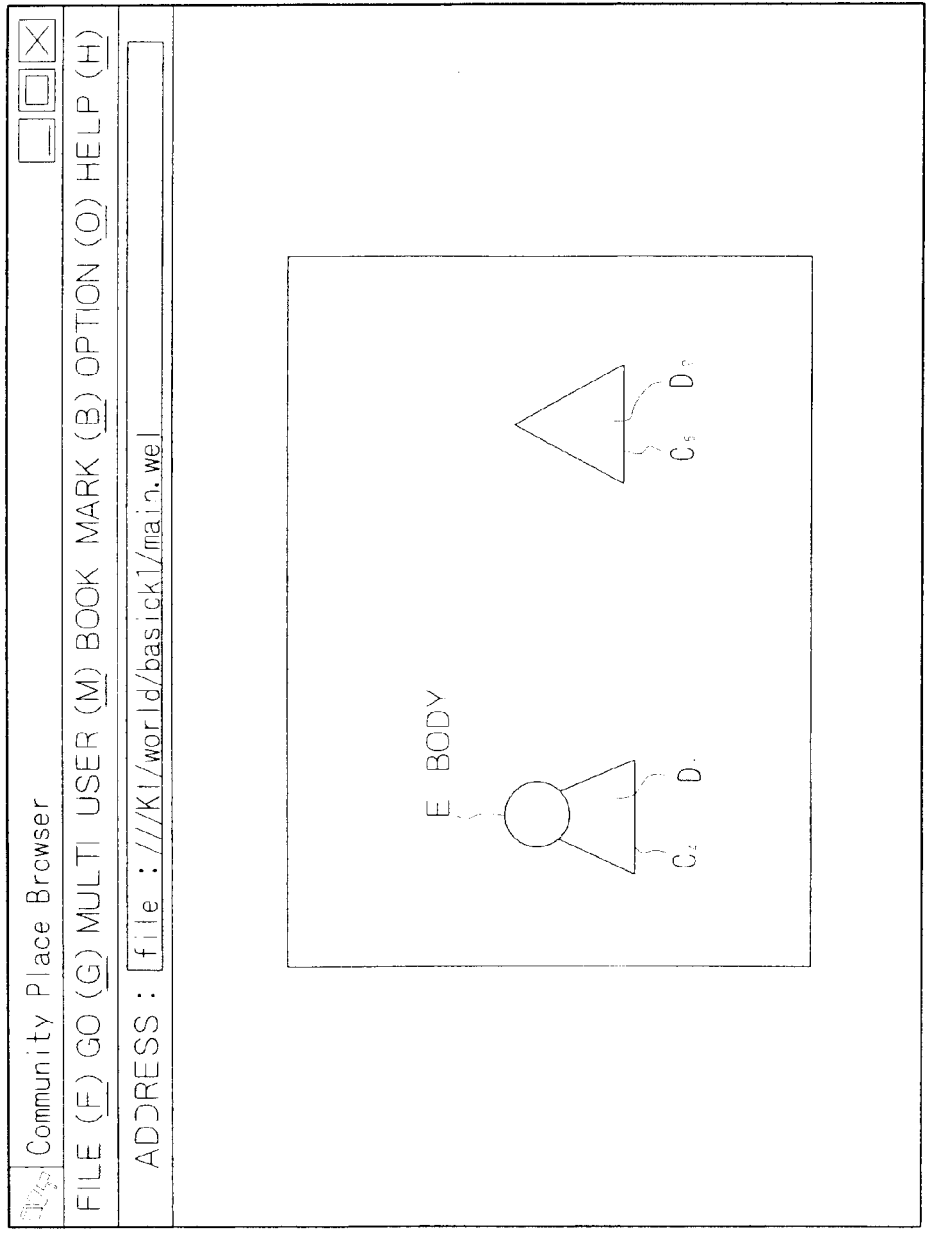
FIG. 17 is a diagram showing an example of an object moving in synchronization with generation of a sound.
Figure 18:
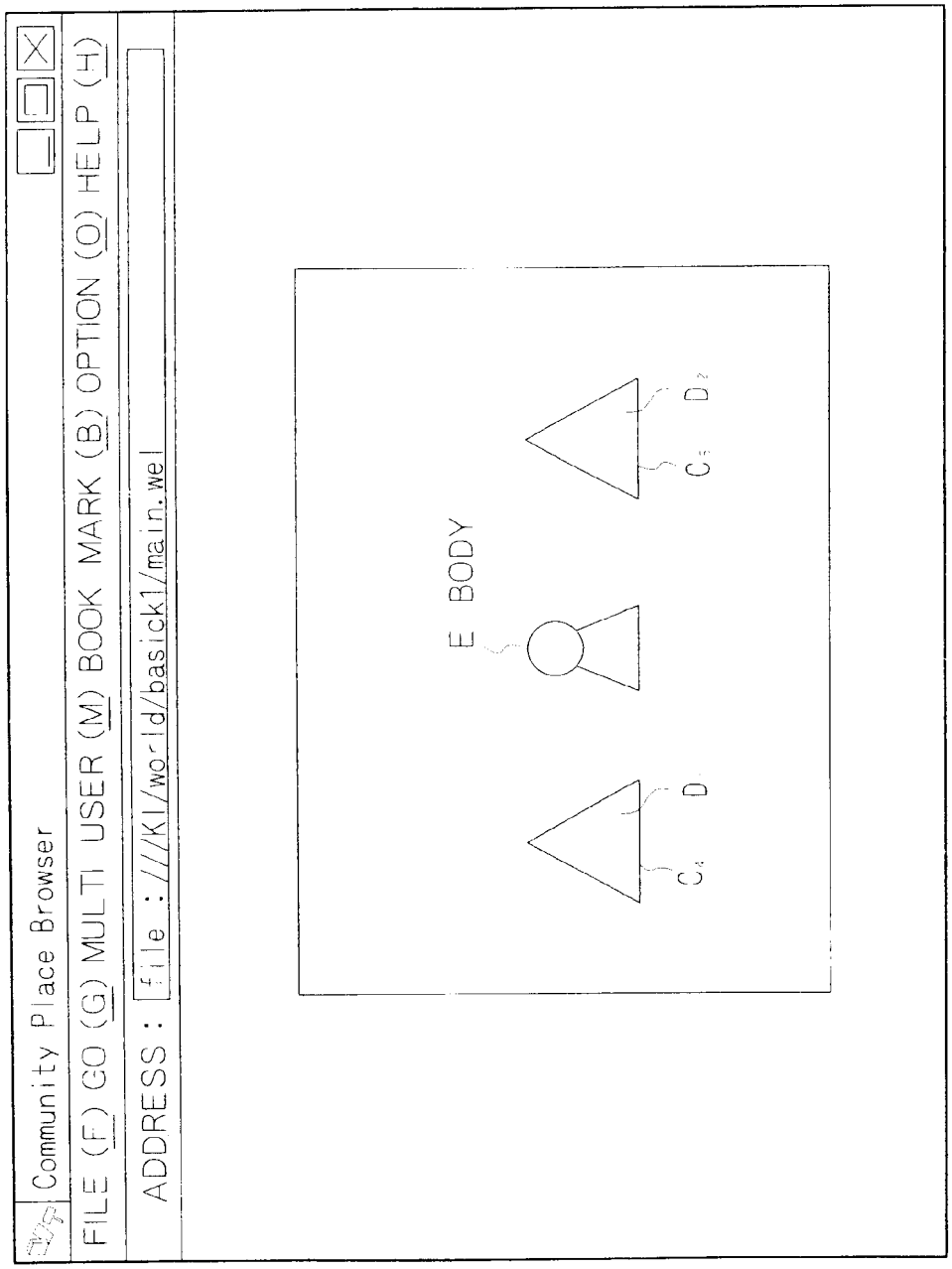
FIG. 18 is a diagram showing the example of the object moving in synchronization with generation of a sound.
Figure 19:
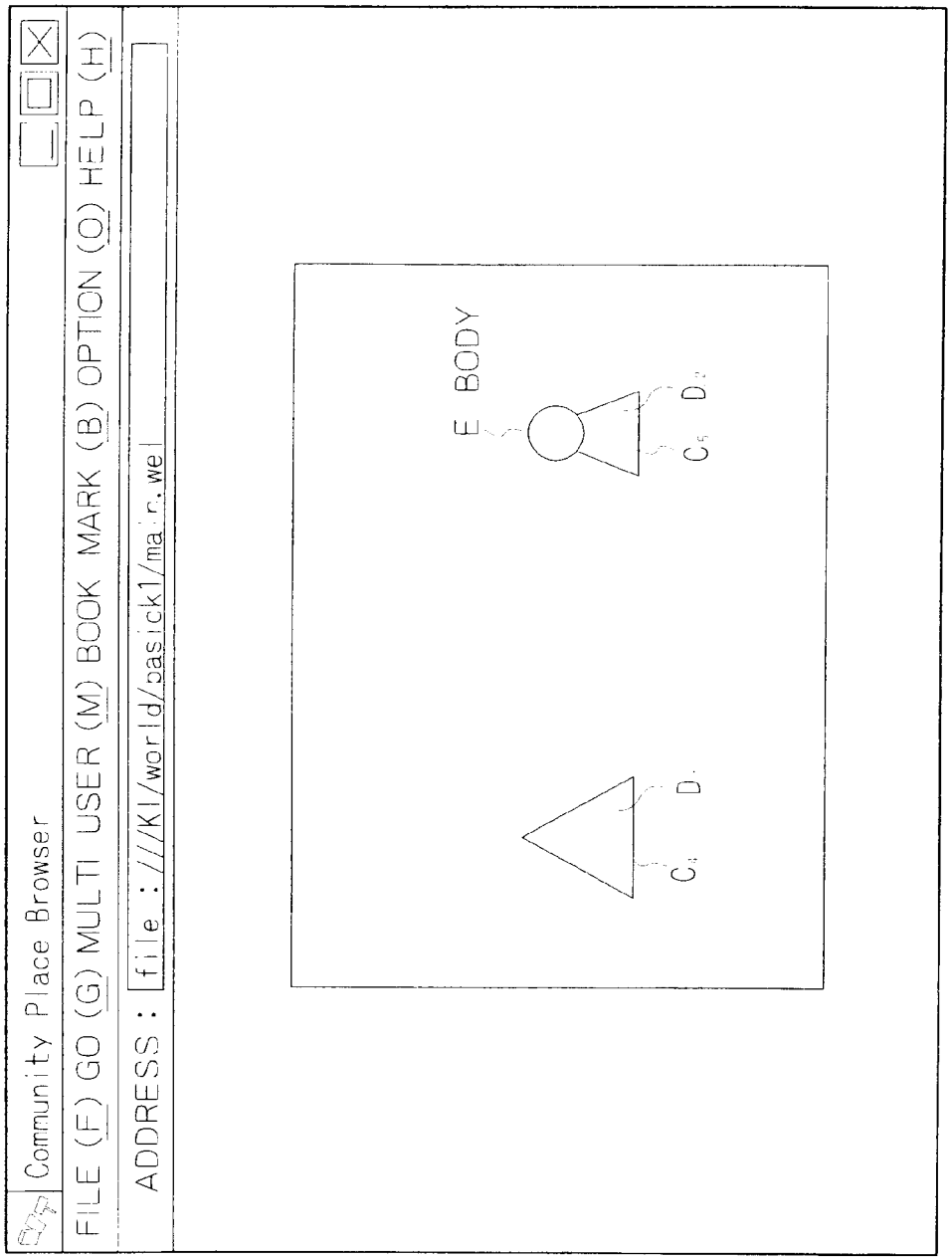
FIG. 19 is a diagram showing the example of the object moving in synchronization with generation of a sound.

FIGS. 17 to 19 are diagrams showing an example in which a picture is changed in synchronization with generation of a sound. In this example, markers D$_1$ and D$_2$ are located at predetermined positions as shown in FIG. 17. Initially, object E located on marker D$_1$ as shown in FIG. 17 generates a C$_4$ sound, to be more specific, a low sound of "do". Then, object E moves from the position of marker D$_1$ to the position of marker D$_2$ to accompany a gradual transition of the sound from C$_4$ to a higher sound of C$_5$, to be more specific, a high sound of "do", as shown in FIG. 18. As object E arrives at the position of marker D$_2$ as shown in FIG. 19, object E generates a C$_5$ sound, to be more specific, a high sound of "do". A program implementing this example is described as follows.

```
#VRML V2.0 utf8
PROTO Sony_AudioClip
[
exposedField SFString description " "
exposedField SFBool loop FALSE
exposedField SFFloat pitch 1.0
exposedField SFTime startTime 0
exposedField SFTime stopTime 0
exposedField MFString url [ ]
eventOut SFTime duration_changed
eventOut SFBool isActive
field MFInt32 eventTracks [ ]
eventOut MFInt32 musicData
field MFNode trackControls [ ]
] {
   AudioClip {
      description IS description
      loop IS loop
      pitch IS pitch
      startTime IS startTime
      stopTime IS stopTime
      url IS url
      duration_changed IS duration_changed
      isActive IS isActive
   }
}
# A node receiving an event generated by the
# Sony_AudioClip node as key data and extracting
# only data of a specified track.
PROTO Sony_MusicNoteInterpolator
[
eventIn MFInt32 musicData
# A field receiving data of Sony_AudioClip.
exposedField SFInt32 track −1
# A field specifying a track of interest.
exposedField MFInt32 key [ ]
# field specifying a range of sound data.
exposedField MFloat keyValue [ ]
# A field specifying a range for projecting sound data.
eventOut SFFloat value_changed
# A field for which output data is issued.
]
{
}
####################################################
###############3
DEF S_MNI_POS Sony_MusicNoteInterpolator {
   track 0 # Extracts data of track 0
   key [48 60] # and maps a range of sounds of
   keyValue [0 1] # (C_4, C_5) on positions between # 0 and 1.
}
DEF PositionIP PositionInterpolator {
   Key [0 1] # Maps a value between 0 and 1
   keyValue [−4 0 0, 4 0 0] # on a position between #(−4, 0, 0) and (4, 0, 0).
}
A marker showing a position at which the object is located
# when the sound of C_4 is generated.
DEF SCALE_LOW Transform {
   translation −4 0 0
   children [
      Shape {
         geometry Cone {
         }
         appearance Appearance {
            material Material {
               diffuseColor 1 0 0
            }
         }
      }
   ]
}
A marker showing a position at which the object is located
#when the sound of C_5 is generated.
```

```
DEF SCALE_HIGH Transform {
  translation 4 0 0
  children [
    Shape {
      geometry Cone {
      }
      appearance Appearance {
        material Material {
          diffuseColor 0 1 0
        }
      }
    }
  ]
}
# An object shown here moves between the 2 markers
  described
# above in synchronization with generation of the sound.
DEF CONE_OBJ Transform {
  children [
    Sound {
      source DEF S_AC Sony_AudioClip {
        loop TRUE
        url "music.mid"
        eventTracks [0] # Attention is paid to track 0.
      }
    }
    Transform {
      translation 0 .5 0
      children [
        Shape {
          geometry Sphere {
            radius 0.5
          }
          appearance Appearance {
            material Material {
              diffuseColor 0.5 0 0
            }
          }
        }
      ]
    }
    Transform {
      translation 0 0 0
      children [
        Shape {
          geometry Cone {
            bottomRadius 0.5
          }
          appearance Appearance {
            material DEF CONE_MATERIAL Material {
            }
          }
        }
      ]
    }
# Data of sound generated from Sony_AudioClip is passed
  to
# Sony_MusicNoteInterpolator.
ROUTE S_AC.musicData TO S_NI_POS.musicData
# Sony_MusicNoteInterpolator converts sound data into
  position
# data as instructed.
ROUTE S_MNI_POS.value_changed TO PositionIP.set_
  fraction
# The position of the object is changed.
ROUTE PositionIP.value_changed TO CONE_OBJ.set_
  translation
# End
```

Figure 20:
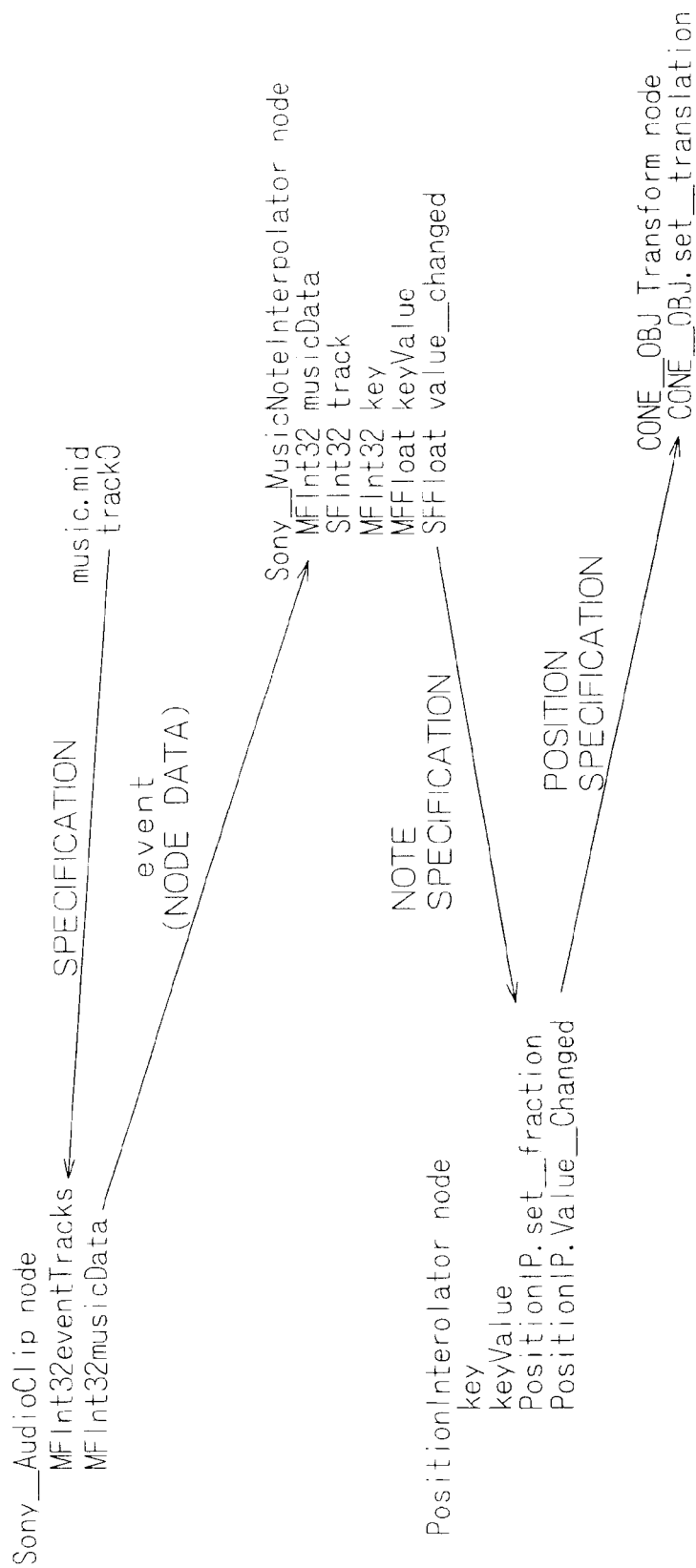
FIG. 20 is an explanatory diagram used for describing exchanges of events among nodes used in the example shown in FIGS. 17 to 19.

FIG. 20 is a diagram showing relations among nodes in the example described above. In this example, the browser 57 reproduces a sound from track 0 recorded in the music-.mid file. As described above, sounds ranging from $C_4$ to $C_5$ are recorded on track 0. These sounds are thus generated.

In the MFInt32 eventTracks field, the Sony_AudioClip node specifies track 0 of the music.mid file as a sound source, fetching its data as an event. In this way, the Sony_AudioClip node is capable of knowing timing with which the sounds ranging from $C_4$ to $C_5$ are generated. Then, the following processing is carried out with timing in time with the generation of the sounds.

That is to say, data of a plurality of tracks specified by eventTracks is output from the MFInt32 musicData field to the MFInt32 musicData field of the Sony_MusicNoteInterpolator node. In the Sony_MusicNoteInterpolator node, data of a track of interest specified by the SFInt32 track field thereof, that is, track 0 in the example, is extracted from data of the same plurality of input tracks.

In the case of this example, $C_4$ representing the low "do" sound and $C_5$ representing the high "do" sound are recorded in the MFInt32 field. Then, the values of the $C_4$ and $C_5$ sounds are held in the MFFloat keyValue field. The SFFloat value_changed field interpolates the value of the note, that is, the value of the height of a sound between the values for the $C_4$ and $C_5$ sounds, outputting a result of the interpolation to the PositionIP.set_fraction field of the PositionInterpolator node. Data of positions corresponding to the $C_4$ and $C_5$ sounds is held in a key field of this node whereas numbers of positions corresponding to the $C_4$ and $C_5$ sounds are held in a keyValue field of this node. A PositionIP.value_changed field outputs position data between positions corresponding to the $C_4$ and $C_5$ sounds to a CONE_OBJ.set_translation field of a CONE_OBJ Transform node. The CONE_OBJ Transform node displays object E at the input position.

It should be noted that a SCALE_LAW Transform node places marker $D_1$ at a predetermined position and a SCALE_HIGE Transform node places marker $D_2$ at a predetermined position.

As described above, object E thus sequentially moves from the position of marker $D_1$ to the position of marker $D_2$ as shown in FIGS. 17 to 19 in synchronization with timing with which the browser 57 generates the $C_4$ to $C_5$ sounds.

FIG. 21 is a diagram showing another example of synchronization of the movement of a picture to generation of a sound. In this example, an avatar dances in synchronization with a sound generated by the browser 57. The synchronization of the movement of a picture to generation of a sound can be implemented with ease by using the Sony_AudioClip node described above.

As described above, a 3-dimensional object is rendered to display an event-driven behavior based on a VRML file. It is thus possible to synchronize the movement of a picture to generation of a sound by generating a musical event from a Sony_AudioClip node at a point of time separated away from timing of music generation processed as a time-driven generation by a predetermined period of time by taking a rendering processing time calculated in advance into consideration.

It should be noted that a program executed for carrying out various kinds of processing is presented to the user in the form of a recording medium such as a CD-R, a CD-ROM or a floppy disc or by way of a presentation medium such as a network. If necessary, such a program is used by recording it in an embedded RAM or a hard disc.

As described above, in the information processing apparatus according to claim 1, the information processing method according to claim 2 and the recording medium according to claim 3, when data of a sound source is output as an event, a change related to the output event is made to a picture of an object. As a result, a movement of the picture can be synchronized with generation of the sound.

What is claimed is:

1. An information processing apparatus for presenting a 3-dimensional virtual reality space expressed in a VRML, said apparatus comprising:

a specification means for specifying a sound source to be played;

an output means for outputting data of the sound source specified by said specification means as an event prior to actual playing of the sound source;

a display control means for displaying a picture of a predetermined object; and a modification means for making a change to the picture of said object related to the event output by said output means, the modification means predetermining a lapsed playing time of the sound source by processing the data of the sound source prior to actual playing of the sound source;

wherein the modification means changes the picture of the obiect in synchronization with the actual playing of the sound source based on the predetermined lapsed playing time of the sound source.

2. An information processing apparatus according to claim 1 wherein said modification means changes a position of the picture of said object.

3. An information processing apparatus according to claim 1 wherein said modification means changes a color of the picture of said object.

4. An information processing method for presenting a 2-dimensional virtual reality space expressed in a VRML, said method comprising:

a specification step of specifying a sound source to be played;

an output step of outputting data of the sound source specified at said specification step as an event prior to actual playing of the sound source;

a display control step of displaying a picture of a predetermined object; and a modification step of making a change to the picture of said object related to the event output a t said output step, the modification step predetermining a lapsed p laying time of the sound source by processing a the data of the sound source prior to a actual playing of the sound source;

wherein the modification step changes the picture of the object in synchronization with the actual playing of the sound source based on the predetermined lapsed playing time of the sound source.

5. An information processing method according to claim 4 whereby, at said modification step, a position of picture of said object is changed .

6. An information processing method according to claim 4 whereby, at said modification step, a color of the picture of said object is changed.

7. A recording medium for recording a computer program to be executed by an information processing apparatus for presenting a 3-dimensional virtual reality space expressed in a VRML, said recording medium used for providing a computer with a computer program comprising:

a specification step of specifying a sound source to be played;

an output step of outputting data of the sound source specified at said specification step as an event prior to actual playing of the sound source;

a display control step of displaying a picture of a predetermined object; and a modification step of making a change to the picture of said object related to the event output at said output step, the modification step predetermining a lapsed playing time of the sound source by processing the data of the sound source prior to actual playing of the sound source;

wherein the modification step changes the picture of the object in synchronization with the actual playing of the sound source based on the predetermined lapsed playing time of the sound source.

8. A recording medium according to claim 7 whereby, at said modification step, a position of the picture of said object is changed.

9. A recording medium according to claim 7 whereby, at said modification step, a color of the picture of said object is changed.

* * * * *